(12) United States Patent
Pierson et al.

(10) Patent No.: US 10,646,828 B2
(45) Date of Patent: May 12, 2020

(54) CYCLIC FILTRATION SYSTEM

(71) Applicant: GEORGIA TECH RESEARCH CORPORATION, Atlanta, GA (US)

(72) Inventors: John A. Pierson, Marietta, GA (US); Aklilu T. G Giorges, Stone Mountain, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 129 days.

(21) Appl. No.: 15/309,671

(22) PCT Filed: May 6, 2015

(86) PCT No.: PCT/US2015/029360
§ 371 (c)(1),
(2) Date: Nov. 8, 2016

(87) PCT Pub. No.: WO2015/171687
PCT Pub. Date: Nov. 12, 2015

(65) Prior Publication Data
US 2017/0259212 A1    Sep. 14, 2017

Related U.S. Application Data

(60) Provisional application No. 61/990,177, filed on May 8, 2014.

(51) Int. Cl.
*B01D 65/08* (2006.01)
*B01D 65/02* (2006.01)
(Continued)

(52) U.S. Cl.
CPC ............ *B01D 65/08* (2013.01); *B01D 65/02* (2013.01); *B01D 61/12* (2013.01); *B01D 61/22* (2013.01);
(Continued)

(58) Field of Classification Search
CPC .... B01D 65/08; B01D 65/02; B01D 2321/18; B01D 2321/40; B01D 2321/2066; B01D 61/22; B01D 61/12; B01D 2321/04
See application file for complete search history.

(56) References Cited

U.S. PATENT DOCUMENTS 3,713,538 A    1/1973  Kass
4,735,726 A *  4/1988  Duggins ............. A61M 1/3496
                                              210/321.75
(Continued)

FOREIGN PATENT DOCUMENTS

DE    102005040520 A1    3/2007
WO    2009/002794 A2    12/2008
WO    2012/145787 A1    11/2012

OTHER PUBLICATIONS

Darvishzadeh, T. et al. "Effects of crossflow velocity and transmembrane pressure on microfiltration of oil-in-water emulsions" [online], Aug. 29, 2012 [Retrieved Nov. 7, 2016]. Retrieved from the Internet< URL: https://arxiv.org/pdf/1208.5668.pdf>.
(Continued)

*Primary Examiner* — Pamela H Weiss
(74) *Attorney, Agent, or Firm* — Troutman Sanders LLP; Ryan A. Schneider

(57) ABSTRACT

A method of filtering a fluid with components includes providing an alternating pressure. The alternating pressure yields an oscillating transmembrane pressure through volume and pressure variations within a filtration chamber while sealing the filtration chamber. A separation surface can be housed in the filtration chamber wherein an influent is introduced. Components can be concentrated on the separation surface, effectively removing some or all of them from the fluid. To flush the filtration chamber and separation surface, a backwash fluid and components can be introduced and removed from the filtration chamber. While both the
(Continued)

components are being concentrated and backwashed, the system can maintain the oscillating transmembrane pressure and varying volume and pressure relative to the separation surface.

19 Claims, 23 Drawing Sheets

(51) Int. Cl.
  *B01D 61/22* (2006.01)
  *B01D 61/12* (2006.01)
(52) U.S. Cl.
  CPC ...... *B01D 2321/04* (2013.01); *B01D 2321/18* (2013.01); *B01D 2321/2066* (2013.01); *B01D 2321/40* (2013.01)

(56) References Cited

U.S. PATENT DOCUMENTS

| | | | |
|---|---|---|---|
| 4,931,186 A * | 6/1990 | Ford | B01D 61/18 210/636 |
| 5,415,781 A | 5/1995 | Randhahn et al. | |
| 5,498,349 A * | 3/1996 | Kurahashi | B01D 29/114 210/798 |
| 5,520,822 A | 5/1996 | Sun | |
| 5,643,455 A * | 7/1997 | Kopp | B01D 65/02 210/321.69 |
| 5,985,160 A * | 11/1999 | DiLeo | B01D 63/16 210/388 |
| 6,303,035 B1 | 10/2001 | Cote et al. | |
| 6,423,230 B2 | 7/2002 | Ilias et al. | |
| 6,544,424 B1 | 4/2003 | Shevitz | |
| 6,558,537 B1 | 5/2003 | Herrington et al. | |
| 7,273,554 B2 | 9/2007 | Rodenberg et al. | |
| 7,531,042 B2 | 5/2009 | Murkute et al. | |
| 2002/0033367 A1* | 3/2002 | Prince | B01D 39/1692 210/650 |
| 2007/0051679 A1 | 3/2007 | Adams et al. | |
| 2013/0020237 A1* | 1/2013 | Wilt | A61M 1/1037 210/85 |
| 2013/0270161 A1 | 10/2013 | Kumar et al. | |
| 2013/0334136 A1* | 12/2013 | Johnson | B01D 63/02 210/636 |
| 2014/0332467 A1 | 11/2014 | Brummer | |

OTHER PUBLICATIONS

Mackley, M.R. et al. "Cross-Flow Filtration With and Without Cake Formation", Chemical Engineering Science, vol. 19, No. 2, pp. 171-178, 1984 [Retrieved Nov. 7, 2016]. Retrieved from the Internet: < URL: http://www.malcolmmackley.com/wp-content/uploads/2012/11/Mackley_Cross-flow-filtration-with-and-without-cake-formation1994.pdf>.

Jaffrin, M.Y. "Hydrodynamic Techniques to Enhance Membrane Filtration", Annual Review of Fluid Mechanics, 44, pp. 77-76, 2012 [Retrieved Mar. 27, 2012]. Retrieved from the Internet: <http://www.annualreviews.org><DOI: 10.1146/ANNUREV-FLUID-120710-101112>.

G Giorges, A.T. et al. "Flow Dynamic Effect in Cake Shape and Resistance in Membrane Filtration" Proceedings of the ASME 2011 International Mechanical Engineering Congress & Exposition, IMECE2011, Nov. 11-17, 2011, Denver, Colorado, USA [Retrieved Apr. 9, 2014]. [Retrieved from the Internet: <http://proceedings.asmedigitalcollection.asme.org/>.

Jaffrin, M.Y. "Dynamic shear-enhanced membrane filtration: A review of rotating disks, rotating membranes and vibrating systems", Journal of Membrane Science 324, pp. 7-25, Jun. 28, 2008 [online].

Jaffrin, M.Y. et al. "A hydrodynamic comparison between rotating disk and vibratory dynamic filtration systems", Journal of Membrane Science 242, pp. 155-167, Jul. 28, 2004 [online].

Brou, A. et al. "Dynamic microfiltration of yeast suspensions using rotating disks equipped with vanes", Journal of Membrane Science 197, pp. 269-282, Aug. 28, 2001 [online].

Kroner, K.H. et al. "Dynamic Filtration of Microbial Suspensions Using an Axially Rotating Filter", Journal of Membrane Science, 36, pp. 85-100, 1988.

Kadant Inc. "Filtration Systems, Industrial Filtration Products" [online]. [Retrieved from the Internet: <http://kadant.com>.

* cited by examiner

|  |  | Influent[a] | Effluent[b] | Backwash[c] | Total Efficiency |
|---|---|---|---|---|---|
|  | Volume (mL) | 1000 | 1600 | 850 | 65% |
|  | Solids (grams) | 4.35 | 0.05 | 3.37 | 98.9% |
| #50 | 300 < X < 425um | 2.70 |  |  |  |
| #100 | 150 < X < 300um | 1.65 | 0.04 | 3.36 |  |
| #200 | 75 < X < 150um |  | 0.01 | 0.01 |  |

[a] The initial influent volume used for the 4.35-grams of solids
[b] Total effluent volume captured during the filtration cycle
[c] Total volume of liquid captured during the backwash cycle

Fig. 8A

|  |  | Influent[a] | Effluent[b] | Backwash[c] | Total Efficiency |
|---|---|---|---|---|---|
|  | Volume (mL) | 1000 | 2100 | 600 | 78% |
|  | Solids (grams) | 4.35 | 0.34 | 3.07 | 92.2% |
| #50 | 300 < X < 425um | 4.35 |  |  |  |
| #100 | 150 < X < 300um |  | 0.04 | 3.36 |  |
| #200 | 75 < X < 150um |  | 0.01 | 0.01 |  |

[a] The initial influent volume used for the 4.35-grams of solids
[b] Total effluent volume captured during the filtration cycle
[c] Total volume of liquid captured during the backwash cycle

| Volume & Concentration Changes | | |
|---|---|---|
| Volume (mL) | Concentration (g/L) | Weight (g) |
| 32.1 | 0.04 | 0.00 |
| 29.2 | 5.3 | 0.15 |
| 28.3 | 6.1 | 0.17 |
| 27.1 | 5.9 | 0.16 |
| 25.1 | 6.8 | 0.17 |
| 21.1 | 6.8 | 0.14 |
| 14.7 | 6.5 | 0.10 |
| 125.3 | 7.6 | 0.95 |
| 23.6 | 25.5 | 0.60 |
| 242.3 | 7.6 | 1.84 |
| 326.5 | Sum | 2.44 |
| | Sum | 1.85 |
| | Total | 4.29 |
| Measured (16.9-g/L) | | 4.77 |
| Ideal (20.9-g/L) | | 6.03 |

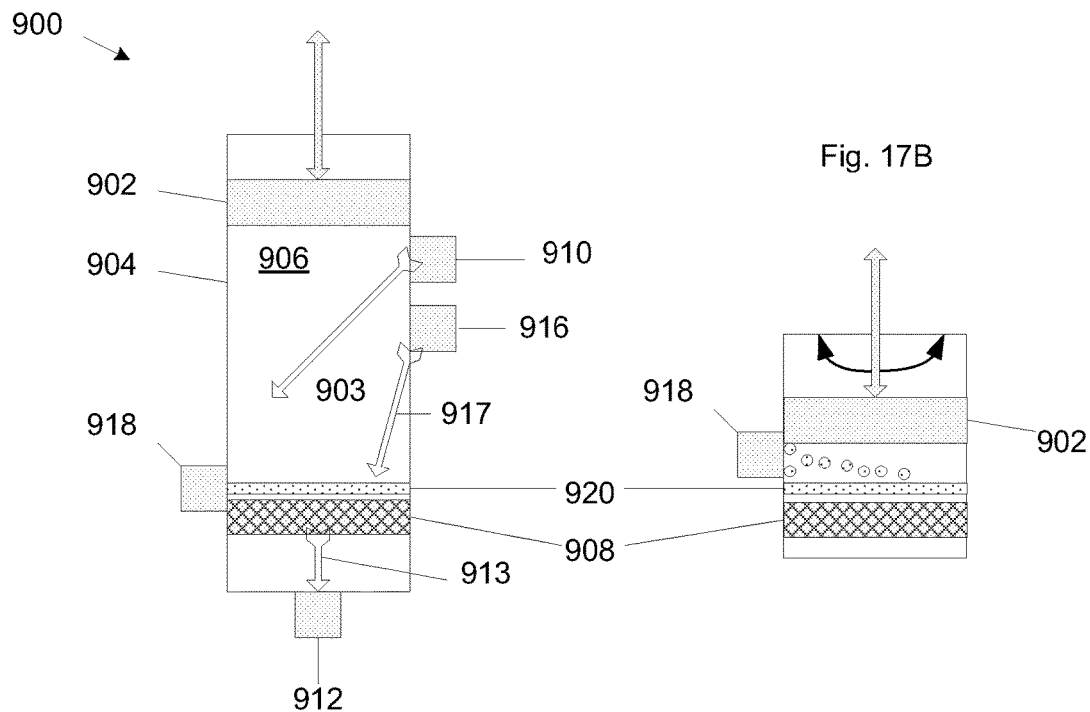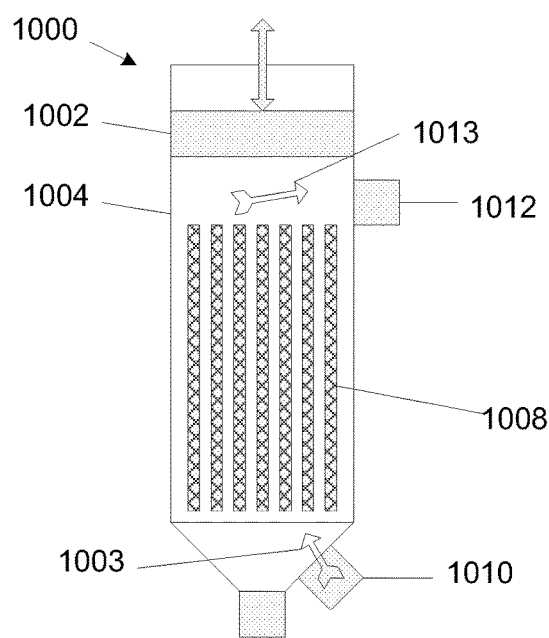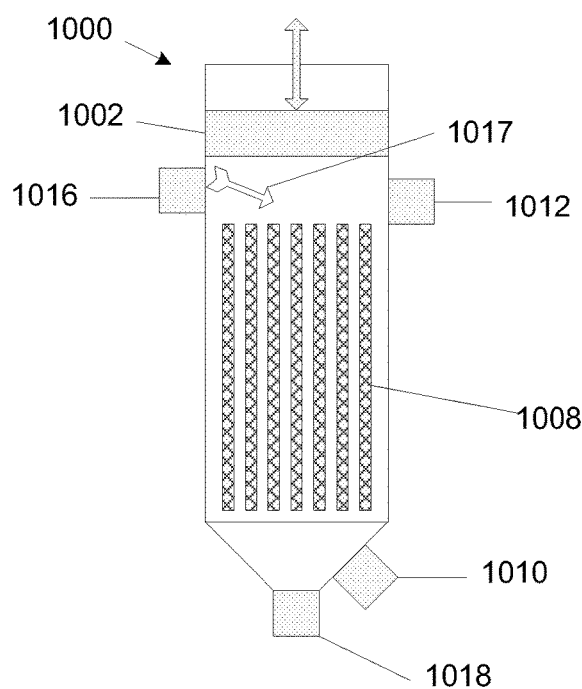

CYCLIC FILTRATION SYSTEM

CROSS-REFERENCE TO RELATED APPLICATION

This application is a U.S. National Stage of International Patent Application No. PCT/US2015/029360, filed 6 May 2015, which claims priority to U.S. Provisional Application Ser. No. 61/990,177 filed 8 May 8, 2014. The entire contents and substance of which are incorporated herein by reference in their entirety as if fully set forth below.

FIELD OF THE INVENTION

The present invention is related to methods and systems for filtering fluids and backwashing the filters, and more particularly, methods and systems for generating fluid flow that increases flux rates via oscillating transmembrane pressure associated with varying volume and pressure.

BACKGROUND

A major challenge for various methods of filtration and separation known in the art for removing fluids from components, particularly as the separation surface gap openings decrease in size, is that particulate matter deposits with time forming a cake at the separation surface that eventually reduces membrane permeability (concentration polarization or gradient created by components which cannot pass through the separation surface.). Recent efforts have sought to mitigate the decreased flux rates by increasing pressure or providing surface shear to reduce the concentration polarization and cake buildup. A review of shear-enhanced membrane filtration of rotating cylindrical membranes, rotating disk, and vibrating surface to examine membrane characteristics and how flow dynamics affect filtration processes (Jaffrin, M. Y., *Dynamic shear-enhanced membrane filtration: A review of rotating disks, rotating membranes and vibrating systems*, Journal of Membrane Science vol. 324, pgs. 7-25, 2008; Jaffrin, M. Y., *Hydrodynamic Techniques to Enhance Membrane Filtration*, Annu. Rev. Fluid Mech. vol. 44 pgs. 77-96, 2012). Related technological approaches for reducing surface build-up include tangential flow filtration an axially rotating filter (Kroner K. and V. Nissinen, *Dynamic Filtration of Microbial Suspensions Using an Axially Rotating Filter*, Journal of membrane Science, vol. 36, pgs. 85-100, 1988), rotating disks equipped with vanes (Brou, A, et al., *Dynamic microfiltration of yeast suspensions using rotating disks equipped with vanes*, Journal of Membrane Science, vol. 197, pgs. 269-282, 2002), and vibratory systems (Jaffrin, M. Y. et al., *A hydrodynamic comparison between rotating disk and vibratory dynamic filtration systems*, Journal of Membrane Science vol. 242, pgs. 155-167, 2004). Recent work supporting this proposal examined the size and character of cake buildup to overcome the drawbacks associated with membrane fouling and thus developing a technology with cleaning process that removes or eliminates cake and maintains a reasonable flux for an extended period, (Giorges, A. T. G. and Pierson, J., *Flow Dynamic Effect In Cake Shape And Resistance In Membrane Filtration*, Proceedings of the ASME 2011 International Mechanical Engineering Congress & Exposition IMECE2011, 2011). Similar systems designed to filter chemical components utilize adsorption and solvents not dissimilar to chromatography (WO 2009/002794). For the various methods of filtration and separation known in the art for removing liquids from solids, the process is stopped to backwash the separation surface, typically while unfiltered liquid streams are diverted to a second filter.

Therefore, there is a need for new methods and devices that (cyclic, dynamic) filter and separate fluids and components while mitigating surface cake buildup and concentration polarization while maintaining greater flux rates and solids removals.

SUMMARY

An object of the present invention is to use oscillating transmembrane pressures (positive and negative relative to the separation surface) with continuously drawing and discharging liquid to constantly lift the filtered solids cake or prevent deposition of materials on the separation surface. This can yield higher continuous flux rates and greater solids concentrations through recurrent cleaning and/or backwashing of the separation surface. Aspects of the examples of the methods and systems can incorporate oscillating motive force in combination with varying volume and pressure to sequentially draw liquid into the cavity and subsequently discharge it through a filter or membrane (i.e. the separation surface), resulting in component removal/concentration in the filter cavity and discharged liquid filtrate/permeate from the fluid and its components. The solids concentrated within the cavity as well as any material captured or entrained on the separation surface are periodically removed by reversing the direction of flow (draw and discharge) while still maintaining the oscillating motive force and varying volume and pressure relative to the separation surface. Air or gas sparging can also be an additional motive force. Sparging, in this context, forms pulsed flows across the filtration membrane, the combination of the hydrodynamic shear stresses, bubble-induced turbulent flow, and cross flows can clear solids from the membrane. However, these pulsed flows disrupt the normal flows and pressures generated during the filtration cycle. This can decrease the flux rates ($L/m^2*hr$). Also, certain sparging techniques require the filtration device to be taken "off-line" for sparging and then returned to service. Problems of decreased flux rates due to separation surface blinding or solids build-up are largely eliminated using the methods and devices as described herein.

Summaries of other examples include a method of filtering a fluid with components. The method can include the steps of performing a feed/filtration cycle. This cycle can have steps that discharge an influent having components into a filtering chamber having a separation surface. A long face of the separation surface can be disposed approximately perpendicular to a direction of influent flow. A positive pressure can be created within the filtering chamber using a moving component. The influent can be displaced through the separation surface using the positive pressure. This can remove at least some of the components with the separation surface, and form a filtrate. The filtrate can be released from the filtering chamber to complete the filtration cycle. A backwash cycle can be performed with the steps of discharging a backwash fluid into the filtration chamber and drawing the backwash fluid through the separation surface using a negative pressure formed by the moving component. These steps dislodge the components retained on the separation surface, and then drain the dislodged components.

In another example, the method further has the steps of opening an influent valve during the discharging of the influent step, closing a filtrate valve and at least one backwash valve, and performing a draw stroke with the moving component. A different example of the method further includes opening a filtrate valve during the creating and displacing steps and closing the influent valve and at least one backwash valve. Further examples of the method have steps of opening at least one of the influent valve, the filtrate valve, and the backwash fluid valve while discharging the backwash fluid and opening a backwash discharge valve at least during the draining step. In examples, one or more valves can be any of the above described valves (influent, backwash, or filtrate valve) discussed above, depending on the needs of the system.

A separate method of filtering a fluid with components includes providing a motive force using a moving element. The movement can yield an oscillating transmembrane pressure through volume and pressure variations within a filtration chamber while sealing the filtration chamber containing the moving element. A separation surface can be housed in the filtration chamber wherein an influent is introduced. Components can be concentrated on the separation surface, effectively removing some or all of them from the fluid. Flushing the filtration chamber and separation surface can remove a backwash fluid and components from the filtration chamber. While the components are being concentrated and backwashed, the system can maintain the oscillating motive force and varying volume and pressure relative to the separation surface.

Other examples include using at least one of a split ring or apex seals to seal the moving element and filtration chamber. Another example includes concentrating the components when the moving element is in a pressure stroke. Also, the removing step can occur when the moving element is in a draw stroke. Additionally, the filtration chamber can be monitored with sensors.

An example of a dynamic filtering system can include a filtration chamber enclosing a volume having a first end and a second end and a moving element disposed in the volume approximate the first end. The moving element can have a first stroke and an opposite second stroke. An influent port can introduce an influent having components into the filtration chamber. A separation surface is further disposed in the volume approximate the second end and filters out the components when the influent passes through it. A filtrate port can remove a filtrate from the filtration chamber, filtrate is the resulting fluid passed through the separation surface. A backwash fluid port introduces backwash fluid into the filtration chamber and can be disposed on a filtrate side of the separation surface. A backwash component port can remove the components from the filtration chamber during a backwash cycle. From above, the first stroke can be one of a draw stroke or a pressure stroke and the second stroke is the opposite of the first stroke. During a filtration cycle, the influent port is opened during the first stroke and closed during the second stroke, and the filtrate port is closed during the first stroke and opened during the second stroke. During the backwash cycle, the influent port is closed during the first stroke and the backwash fluid port and the backwash component port are opened during the first stroke.

In an example, the backwash cycle occurs at most on every other first stroke. Thus, the systems can have many filtering cycles to one backwash cycle or have one backwash cycle to every filter cycle or any pattern in between depending on the flux of the system.

In other examples, the filtrate port can be the backwash fluid port. Further, the separation surface can be disposed parallel to a face of the moving element. Additionally, the inlet port and the backwash component port can be controlled by the same valve. Also, the filtrate port and the backwash fluid port can be controlled by the same valve.

BRIEF DESCRIPTION OF THE DRAWINGS

This invention is described with particularity in the appended claims. The above and further aspects of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

The drawing figures depict one or more implementations in accord with the present teachings, by way of example only, not by way of limitation.

FIG. 8A is a table illustrating a mass balance for solids and liquids captured during cyclic filtration of brewed coffee grounds of Experiment 1;

FIG. 9A is a table illustrating a mass balance for solids and liquids captured during cyclic filtration of brewed coffee grounds placed in surrogate poultry processing chiller water of Experiment 2;

FIG. 14 is a table outlining the sample volume and the concentration of retained solids in the prototype;

FIGS. 17A & 17B illustrate an example of a Nutsche filter as modified by the present invention;

FIGS. 18A & 18B illustrate an example of a candle filter as modified by the present invention;

DETAILED DESCRIPTION

Figure 1:
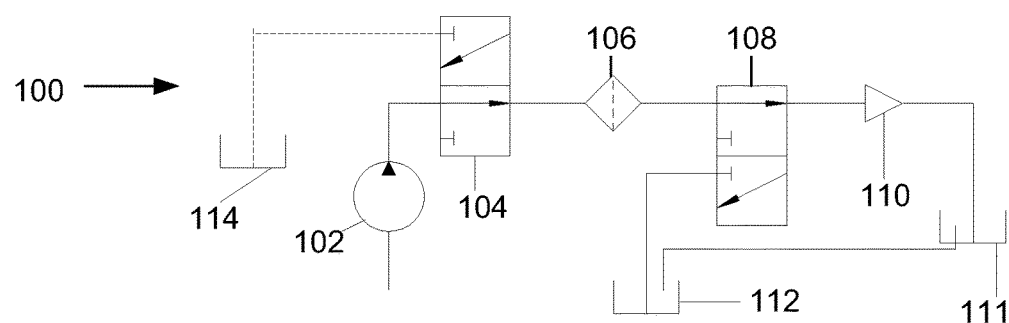
FIG. 1 is a schematic view of an example of a cyclic filtration system of the present invention.

FIG. 1 illustrates a schematic example of a cyclic filtration system 100. The system 100 has both a filtration and a backwash condition. Describing the system first from the filtration condition, the system 100 includes a source of static head, which can be pump 102 or an elevated basin (not illustrated) discharging a fluid with particulates to be filtered out ("influent") into a first valve set 104. The influent then passes through a separation surface (e.g. a filter) 106 in which the particulates are left on the filter 106 and the filtrate passed to a second valve set 108. The filtrate then passes through outlet port 110, and in some examples, to a filtrate reservoir or tank 111. For the backwash condition, the first and second valve sets 104, 108 are reversed. Now, a backwash fluid from a backwash fluid reservoir 112, through the second valve set 108, is passed to the filter 106 to dislodge the particulates accumulated on the filter 106. The backwash fluid and particulates are passed back through the first valve set 104 to backwash drain 114. The pump 102 creates the negative pressure to draw the backwash fluid through the filter 106. In some examples the backwash fluid can be filtrate from the filtrate tank 111, eliminating the need for the backwash fluid reservoir 112. In other examples, the pump 102 can be a reversible/peristaltic pump, and, alternately, the filtrate tank 111 can be elevated as such to provide enough static head to backwash the filter 106. A second pump (not illustrated) can be placed past outlet port 110 to either create the reverse flow through the filter 106 by drawing out of the tank 111 or pumping the filtrate to the backwash fluid reservoir 112 for a static head condition.

Figure 2:
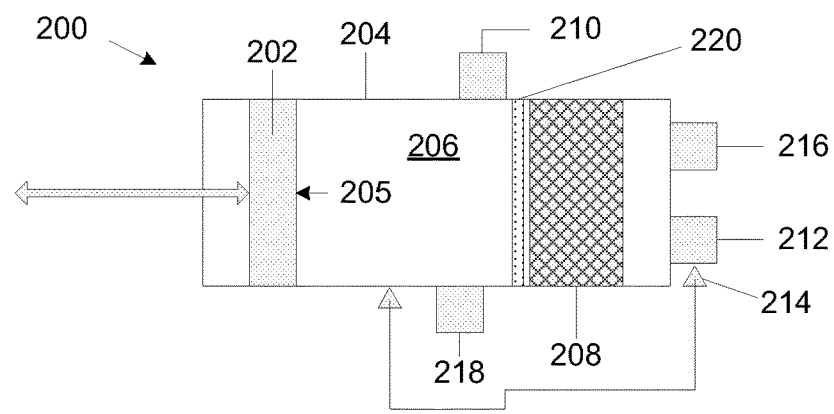
FIG. 2 is an example of a dynamic cyclic filtration system.

Turning now to an example illustrated in FIG. 2, a cyclic-dynamic filtration apparatus 200 includes a moving component 202 that provides motive force to a fluid (liquid or gas). The motive force yields oscillating transmembrane pressures (positive and negative relative to a separation surface 208) through volume and pressure variations within a filtration chamber 204 via reciprocation or rotation. The filtration chamber 204 can include a cavity 206 containing the moving component 202, which in one example, has a face 205 and split ring(s) fitted into a groove on its outer diameter to seal the cavity 206 or apex seals (not illustrated) as the moving component 202 translates. The separation surface (e.g. a filter) 208 is disposed within the filtration chamber 204, in an example, through an opening where it can be removed periodically (not illustrated). An influent port 210 is disposed on the filtration chamber 204 on the moving component 202 side of the filter 208 to introduce a fluid having components for removal ("influent") into the filtration chamber 204. As the moving component 202 moves towards the filter 208, influent drawn in through the influent port 210 can be forced through the filter 208 and discharged through filtrate port 212. The oscillating movement of the moving component 202 creates a varying transmembrane pressure on both faces of the filter surface 208. In an example, a pressure across the filter 208 is monitored using pressure taps 214.

Also disposed on the filtration chamber 204 can be a backwash fluid port 216 and a backwash discharge port 218. These ports 216, 218 can be used to periodically remove concentrated solids 220 and backwash liquid from the filtration chamber 208 as well as any other material captured or entrained on the separation surface 208. The solids 220 can be removed by reversing the direction of flow (draw and discharge) (i.e. changing the opening and closing cycle of the various ports 210, 212, 216, 218) while still maintaining the oscillating motive force and varying volume and pressure relative to the separation surface 208. Other ports for sensors to monitor desired parameters such as pressure 214 can be included.

Using the above as an example, a feed or filtration cycle occurs as the moving component 202 draws a vacuum moving away from the filter 208 causing the influent to enter the cavity 206 through influent port 210. The influent port 210 can have a valve, and the valve can be one of ports of the first valve set 104. The remaining ports 212, 216, 218 can also have valves (related to the first and second valve sets 104, 108) and one or more can be closed. As the moving component 202 moves towards the filter 208, fluid is forced out of the cavity 206 through the filter 208 and filtered fluid is discharged through the filtrate port 212. The oscillating movement of the moving component 202 creates varying transmembrane pressure on both faces of the filter surface 208.

A cleaning, flush, or backwash cycle can occur by opening the valves for the backwash fluid port 216 (on the second valve set 108) and the backwash discharge port 218 (on the first valve set 104). At the same time, the valves for the influent port 210 and the filtrate port 212 are closed. The moving component 202 creates a vacuum pressure relative to the feed flow which draws backwash fluid out of the backwash fluid port 216 and through the non-solid caked side of the filter 208. The backwashing fluid backwashes the surface of the filter 208 by forcing the caked solids 220 from the filter 208. The solids 220 and remaining retained fluid are flushed out of the cavity 206 through the backwash discharge port 218.

This cyclic method alternates the pressure field to redirect the flow for washing the filter membrane 208 and removing the captured solids 220 every cycle. The cycle time can be adjusted so that the optimal filtrate flow rate is maintained such that cleaning cycle occurs less frequently (after a series of feed cycles) or after each feed cycle. For operations where the cleaning cycle occurs less frequently, the majority of fluid is drawn in through the influent port 210 although a small amount of filtered water is drawn back through the filtrate port 212 to backwash the filter surface 208.

Figure 3A:
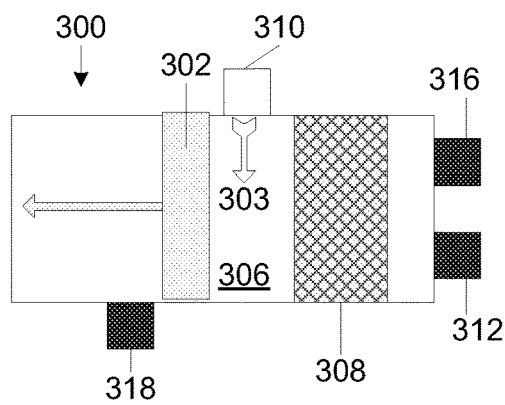
FIGS. 3A-3C illustrate an example of the system passing through a feed, filter, and flush cycle, respectively.
Figure 3B:
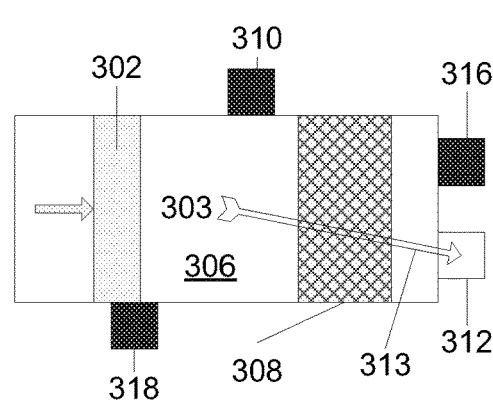
Figure 3C:
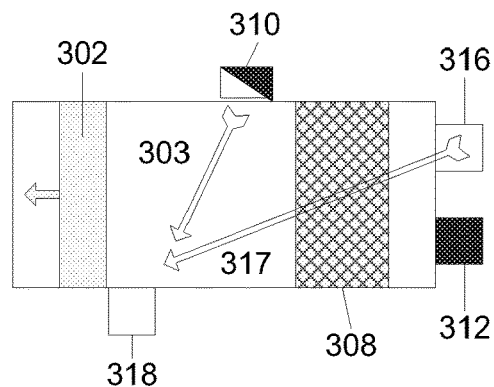

FIGS. 3A-3C illustrate an exemplary sequence of feed, filter, and flush cycles of a cyclic-dynamic filtration apparatus 300. For the feed cycle, a piston 302 (e.g., part of pump 102, moving component 202, or can be replaced with a static head condition (see below)) draws a vacuum by moving away from the filter 308 causing an influent 303 to enter the piston chamber 306 through inlet valve 310 (e.g., part of the first valve set 104, influent port 210). In this example, for a vacuum to be drawn, an outlet valve 312 (e.g., part of the second valve set 108, filtrate port 212) a backwash fluid valve 316 (e.g., part of the second valve set 108, backwash fluid port 216), and a backwash discharge valve 318 (e.g., part of the first valve set 104, backwash discharge port 218) all can to be closed to seal the chamber. See, FIG. 3A. Note that the open valves in FIGS. 3A-3C are illustrated as open boxes and the close valves are shaded.

FIG. 3B illustrates an example of a filter cycle, as the piston 302 moves towards the filter 308, the influent 303 is forced out of the piston chamber 306, through the filter 308, and now becomes filtrate 313. The filtrate 313 can then be discharged through the outlet valve 312. The oscillating movement of the piston 302 creates a varying transmembrane pressure on both faces of the filter surface 308.

The cleaning (flush) cycle occurs by opening the two backflow valves 316, 318 while closing the inlet and outlet valves 310, 312. The piston 302 again creates a vacuum pressure relative to the filtering flow, drawing backwash fluid 317 from the backwash fluid valve 316, through the filter 308 (backwashing the filter surface) and draining through the backwash discharge valve 318. In a separate example, the inlet valve 310 can be opened along with the backwash valves 316, 318 to permit some influent 303 to enter as well, to assist in washing the retained fluid and solids out of the piston chamber 306. See, FIG. 3C.

In examples of the filtration system, the valves can be configured multiple ways. In an example, the first valve set 104 can be a 3-way valve, allowing the influent and discharge to utilize the same port to the filter 106. In this, influent could not be used to assist in washing the filter chamber. The same can hold true for the second filter set 108, utilizing a 3-way valve between the filtrate output and the backwash input. A 2-way valve can also be used, if the filtrate is also used to backwash the filter 106. Other examples use 3-way valves for each of the valves 310, 312, 316, 318 and to add to this example, check valves (not illustrated) can be placed in line with each valve 310, 312, 316, 318 to assure no fluid backflows into the wrong valve.

Further examples allow for flexible feed, filter and flush cycles. In one extreme, the system 100, 200, 300 can perform all three cycles with each pair of reciprocating strokes so the system is both feeding and flushing on the draw stroke and filtering on the pressure stroke. Other examples can vary the time between the feed/filter and the flush cycles. They can be even-length cycles, each cycle performed for the same amount of time, or the feed/flush cycles can have a longer duration. Note that absent removing the filter, examples of the system can feed/filter and flush without interrupting the other cycles. Thus, the system never needs to be taken "off-line" to backwash.

Figure 4A:
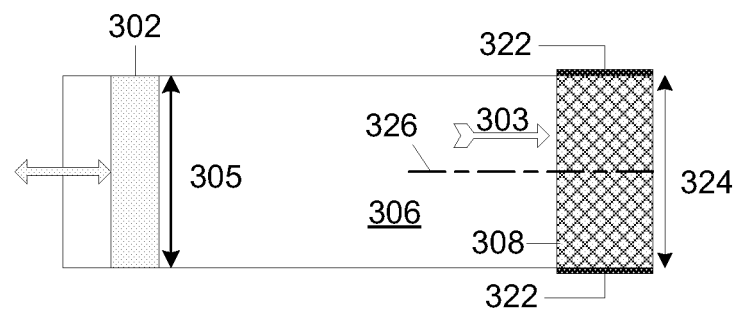
FIG. 4A is an example of a sealed piston cavity and the filter axis.

Yet further examples, as illustrated in FIG. 4A, note that the influent 303 is not by-passed around the filter 308, all of the influent is passed through the filter 308. The piston 302 can be sealed around its diameter 305 and the filter 308 can be sealed 322 tight to the piston chamber 306 (i.e., filter cavity 206). This assists in building up the oscillating transmembrane pressure. The influent can also be passed through a long section 324 of the filter, and not parallel to a long surface of the filter. That is to say there is a filter axis 326 running through the center of the filter, perpendicular to the long end 324, and the influent 303 can flow approximately parallel to the axis 326 (i.e. not perpendicular to the axis).

Figure 4B:
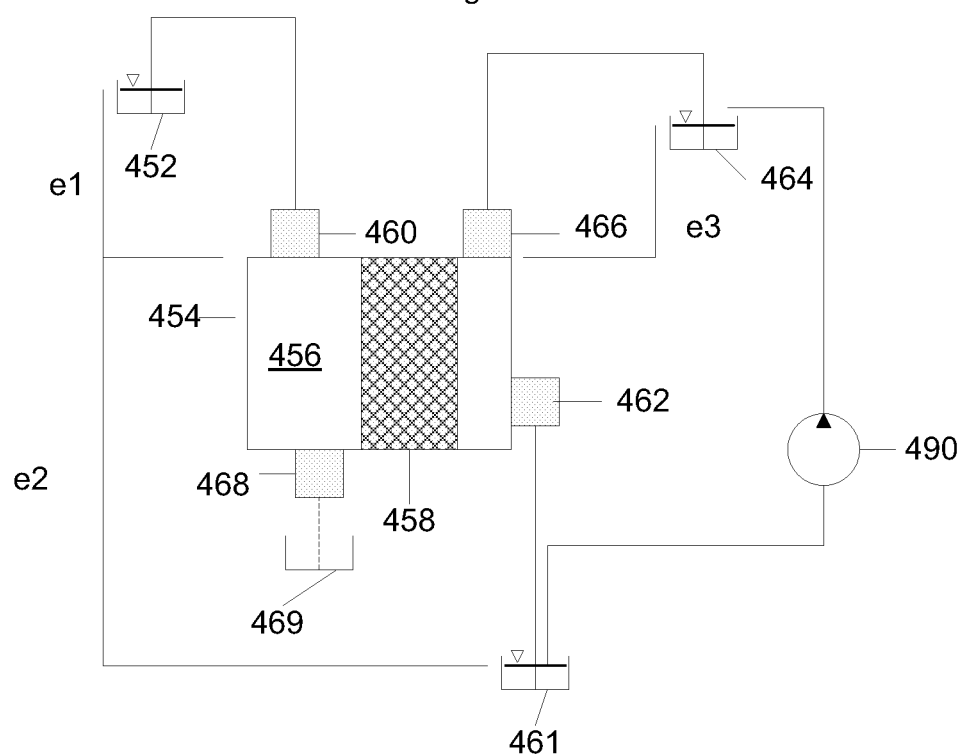
FIG. 4B is an example of a dynamic filtration system using static head.

Additional to any of the examples herein, FIG. 4B illustrates a dynamic filtering system 450 using static head to replace some or all of the hydraulic machinery, including pumps and pistons. FIG. 4B illustrates the elements in general elevations relative to the other elements. The exact elevation differences between the elements can depend on a number of factors known to those of ordinary skill. An influent tank 452 can be set an elevation e1 to the filtration chamber 454. A filter 458 is set within a cavity 456 of the chamber 454. The influent passes through an inlet valve/port 460 into the cavity 456. The elevation difference e1 provides enough energy to pass the influent through the filter 458 during most normal conditions, even as the filter 458 begins to foul with solids. The filtrate that passes through the filter 458 flows through outlet/filtrate valve/port 462 into filtrate tank 461. The filtrate tank 461 can be set at a second elevation e2, lower than both the influent tank 452 and the chamber 454. This additional drop in elevation can help create additional head in the system 450.

For the flush cycle, a backwash fluid tank 464 can be set at an elevation e3 (which can be greater than, equal to, or less than the influent tank elevation e1). This tank 464 can provide the backwash fluid through a backwash fluid valve/port 466. The backwash fluid tank 464 is elevated enough to provide sufficient head to dislodge the solids accumulated on the filter 458 and pass them out of a backwash discharge valve/port 468 into a backwash discharge tank 469. In another example, a backwash fluid pump 490 can be used to pump filtrate into the backwash fluid tank 464 or provide enough head to inject it directly through the backwash fluid valve/port 466.

Figure 4C:
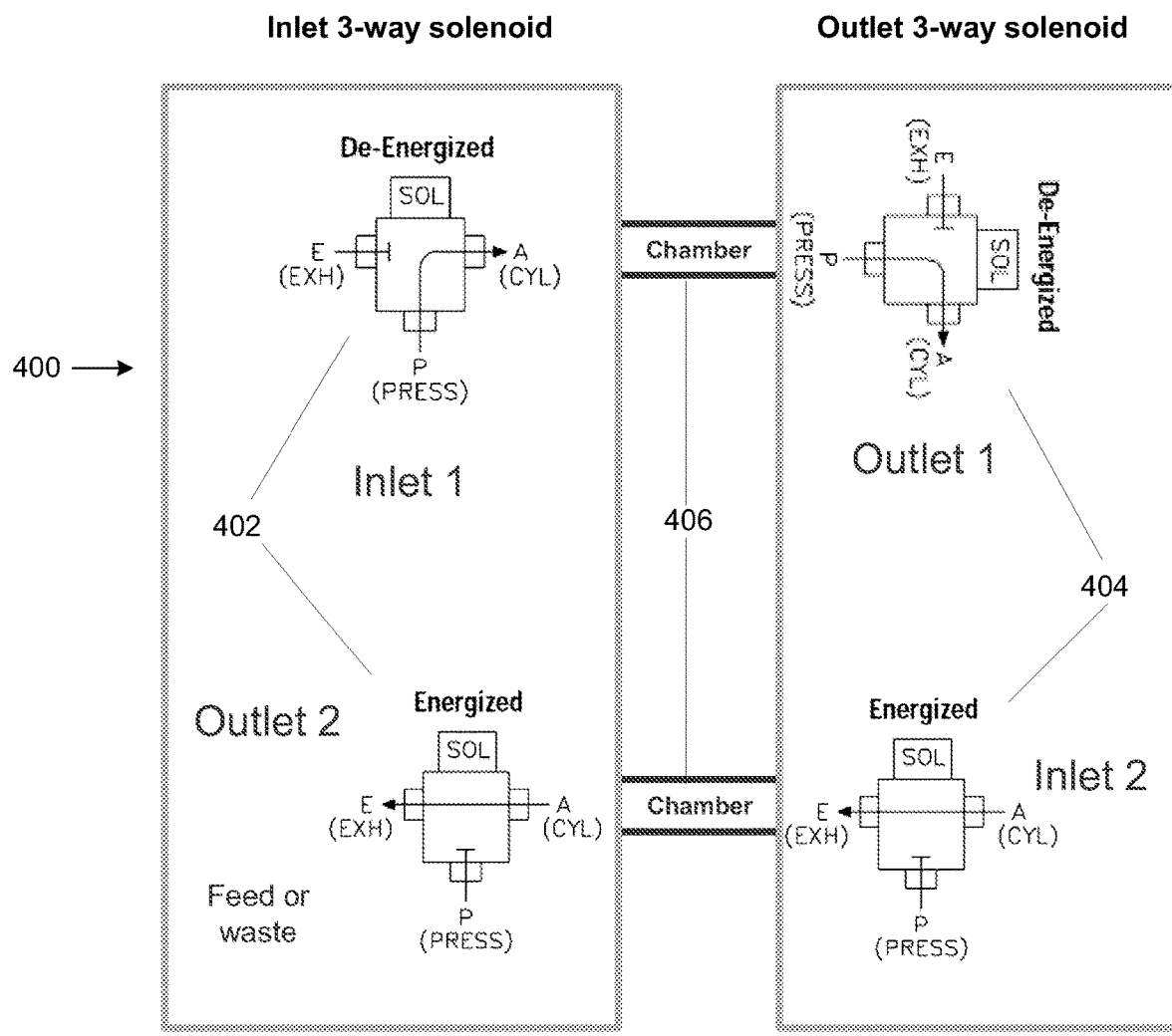
FIG. 4C is an example of valving for the system.

FIG. 4C illustrates an example of the valving of the system 400. Both the inlets and outlets have 3-way solenoid valves. For a feed/filter cycle, inlet 1 has a first 3-way valve 402, which in the de-energized state allows influent in from the pressurization P (press) side to exit through the port A (cyl) into the chamber 406, through the separation surface (not illustrated here) so the filtrate can pass through the second 3-way valve 404, de-energized through outlet 1. Again, the filtrate passes through the pressurized side P (press) and out port A (cyl). The flush cycle is illustrated below the feed/filter cycle. Note that it is the same valves and chamber, just now positioned for the flush cycle. The second 3-way valve 404, once energized, now acts as inlet 2. This allows backwash fluid through the A port (cly) and out the E port (exh), through the "back" of the filter and into the chamber 406. The first 3-way valve 402 is now also energized to act as outlet 2. Here the valve 402 allows the backwash (fluid and solids) through the A port (cyl) to be sent outside the system, through E port (exh).

Figure 5:
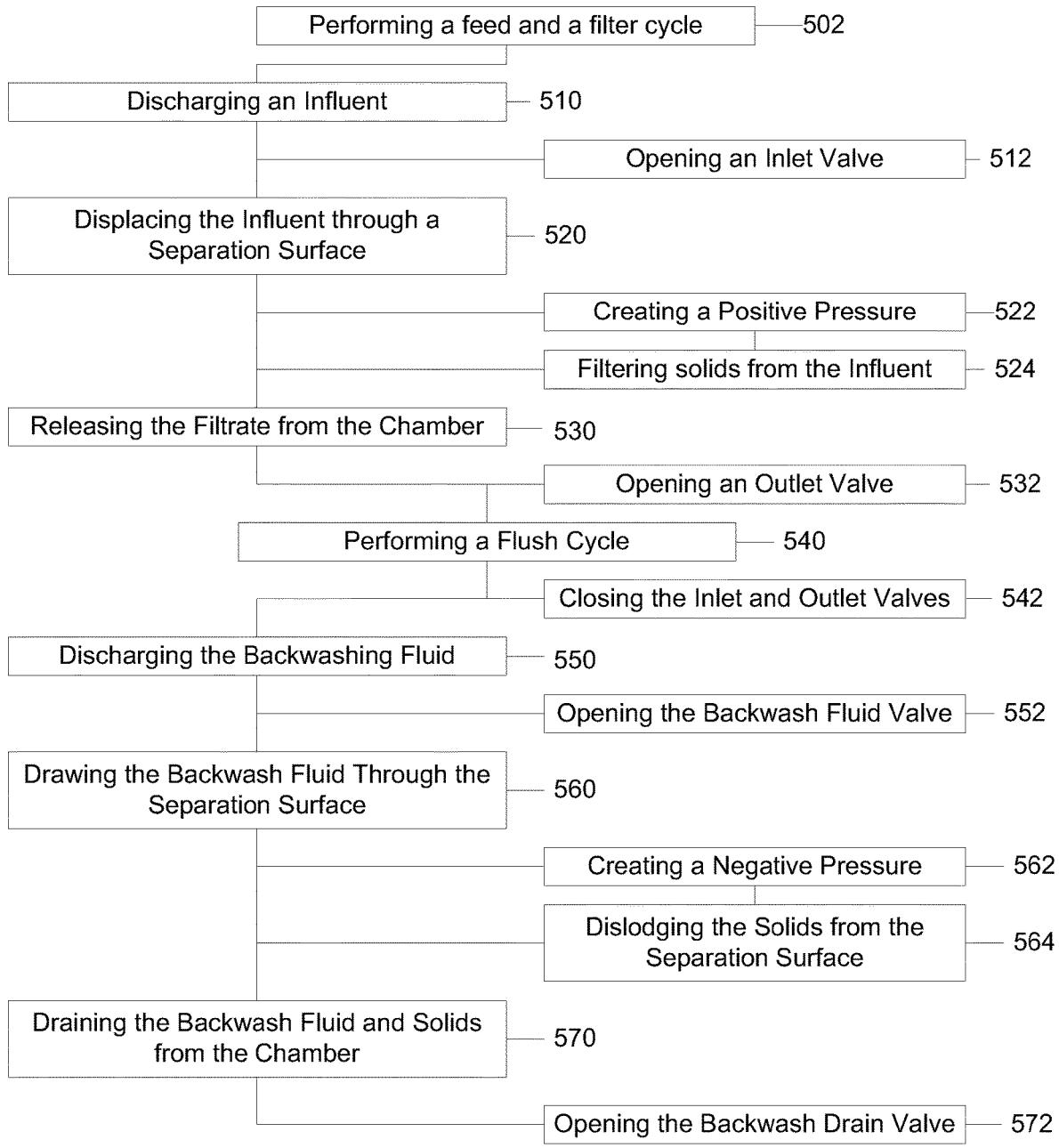
FIG. 5 is a flow-chart outlining an example of a method of using a cyclic dynamic filtration system.

FIG. 5 illustrates an example of a method 500 of cyclic dynamic filtration, using any of the examples above. Performing a feed and a filter cycle (step 502) can include the step of discharging an influent 303 into a filter chamber 206, 306 having a separation surface 106, 208, 308 (step 510). Part of that step can include opening an inlet valve 310 (step 512). The influent 303 can be displaced through the separation surface 106, 208, 308 to form a filtrate 313 (step 520). As part of the displacement, the moving component 102, 202, 302 can create a positive pressure to force the influent 303 through the separation surface 106, 208, 308 (step 522) and the separation surface 106, 208, 308 can filter solids 220 from the influent 303 (step 524). The filtrate 313 can then be released from the chamber 206, 306 (step 530). This can be accomplished by opening the outlet valve 310 (step 532).

The next steps describe an example of a flush cycle (step 540), which can start by closing the inlet 310 and outlet 312 valves (step 542). The backwash fluid 317 can be discharged into the chamber 206, 306 (step 550) by opening the backwash fluid valve 316 (step 552). The backwash fluid 317 can then be drawn through the separation surface 106, 208, 308 (step 560) by creating a negative pressure with the moving component 102, 202, 302 on a draw stroke (step 562). As the backwash fluid 317 is drawn through the separation surface 106, 208, 308, it can dislodge solids 220 accumulated on the separation surface 106, 208, 308 (step 564). The backwash fluid 317 and the solids 220 can be drained from the chamber 206, 306 (step 570) in part from opening the backwash drain valve 318 (step 572).

Figure 6:
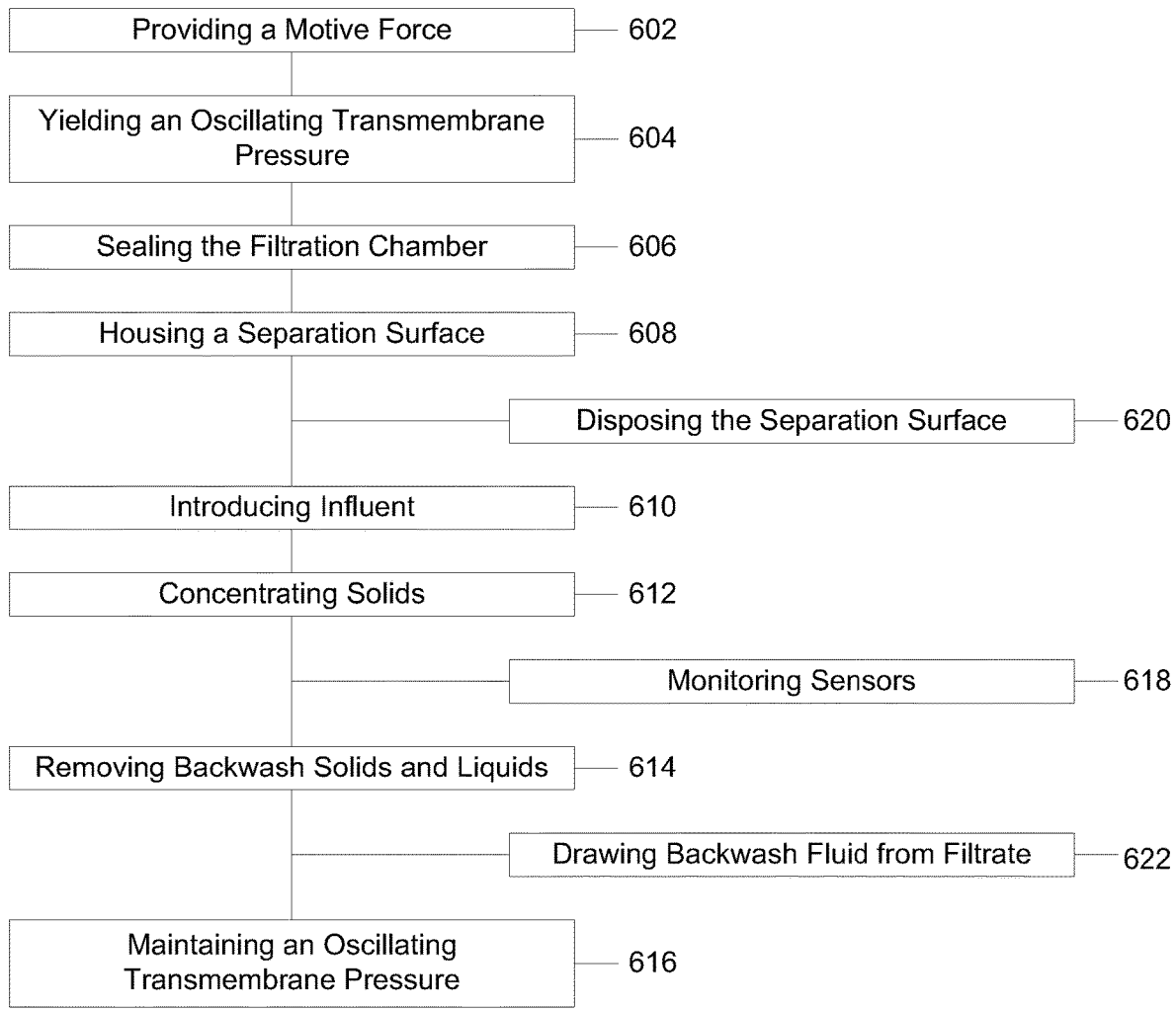
FIG. 6 is a flow-chart outlining another example of a method of using a cyclic dynamic filtration system.

Another example of a method to filter a fluid with components, as illustrated in FIG. 6 includes providing a motive force (liquid or gas) using a moving component 102, 202, 302 (step 602) to yield an oscillating transmembrane pressure (positive and negative relative to the separation surface) (step 604) through volume and pressure variations within the filtration chamber 204 via one of a reciprocating or rotational motion. Sealing the filtration chamber 204, which includes a cavity 206, 306 and the moving component 102, 202, 302, can involve using split ring(s) fitted into a groove on an outer diameter 305 (see FIG. 4A) of the moving component 102, 202, 302. The split ring(s) can seal the cavity 206, 306 (step 606). Alternately, apex seals can be used as the moving component 102, 202, 302 translates. Housing the separation surface 106, 208, 308 in an opening on the filtration chamber 204 (step 608) that both discharges filtrate 313 out of the filter chamber 204 into a holding tank and receiving the drawn recycle water (as backwash fluid 317) back through into the filter chamber 304 as required. An influent port 210 introduces a fluid with components for removal (influent) 303 into the filtration chamber 204 (step 610). Through the process, solids can be concentrated on the separation surface 106, 208, 308 (step 612). A backwash port 216 can periodically remove concentrated solids and backwash liquid 220, 317 from the filtration chamber 204 as well as any other material captured or entrained on or in the separation surface 106, 208, 308 (step 614). Another step includes maintaining the oscillating motive force and varying volume and pressure relative to the separation surface 106, 208, 308 while periodically reversing the direction of flow (draw and discharge) (step 616). Also, other port(s) can be monitored with sensors (e.g. pressure taps 214) to monitor desired parameters such as pressure (step 618). At least one of solenoid, electro-actuated, mechanical, and check valves can be used to facilitate forward, recycle and discharge flows.

This method can also include disposing the separation surface 106, 208, 308 long end 324 parallel to, or offset from, the face 205 of the moving component 202 (step 620). The face 205 can generate the oscillating transmembrane pressure. Another example can draw the backwash fluid 317 (e.g., fluid without components) from the filtrate holding tank 111 (step 622). Further, the cavity 206, 306 can contain apex seals and the moving component 202 can rotate past the various opening 210, 212, placed on the filtration chamber 204 and separation surface 208.

The system 100, 200, 300, 400 can include a programmable logic controller (PLC) and servo motor configuration providing a variety of feedback mechanisms (e.g., time, pressure, piston position, torque, flow rate, solids loading, solids capture, volumetric efficiencies, etc.) that can be used to customize the system differing fluid and component combinations. The PLC and servo motor configuration (or other means for maintaining oscillating transmembrane pressure) can be decoupled or eliminated with appropriate monitoring.

Figure 7A:
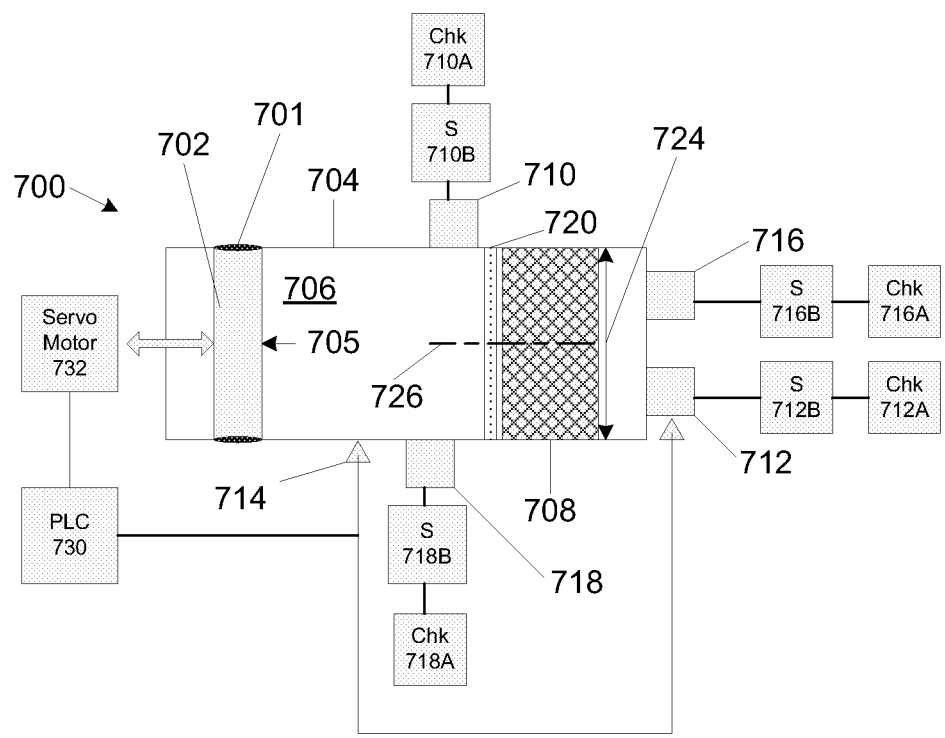
FIG. 7A is another example of a dynamic cyclic filtration system.
Figure 7B:
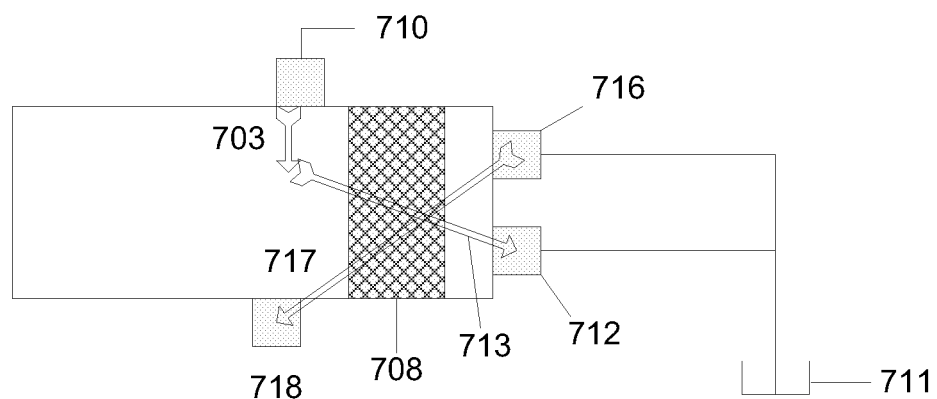
FIG. 7B illustrates an example of the fluid flow within the system passing through feed, filter, and flush cycles.

FIGS. 7A and 7B illustrate another example of a cyclic-dynamic filtration system 700. This system 700 can be described using recurring cycles of cyclic or dynamic filtration. That is a filter cycle and a full backwash (flush) cycle, respectively. As described above, the system 700 can include a moving component 702, a filtration chamber 704, and a cavity 706 with a separation surface 708. The cavity 706 contains the moving component 702 that can translate linearly to yield a reciprocating motion;

Included in this example are a programmable logic controller (PLC) 730 and servo motor 732. The PLC 730 can run certain programs which can control and set the parameters for the feed, filter, and flush cycles. This includes setting the servo motor 732 to control the moving component 702, and the opening and closing of the valves described below. The PLC 730 programs the cycles based a variety of feedback mechanisms including on time, pressure, moving component position, torque, flow rate, solids loading, solids capture, volumetric efficiencies, etc. Once the PLC 730 has monitored and configured the appropriate settings and the cycles are functioning properly, the PLC 730 can be decoupled and appropriate monitoring maintained to verify cycle functioning.

The separation surface 708 can be placed in such a way that its long surface 724 is perpendicular to a moving component face 705 which generates the oscillating transmembrane pressure. Stated differently, the long surface 724 of the separation surface 708 can be perpendicular as well to a filter axis 726. The filter axis 726 can be parallel to the direction of motion of the moving component 702. The flow cycle direction, as illustrated in FIG. 7B can be influent 703 from an influent port 710, through the separation surface 708, and a filtrate 313 is discharged through a filtrate port 712. Then filtrate 713 and/or backwash fluid 717 is discharged back through the separation surface 708 to the backwash discharge port 718.

To begin a cycle, the PLC 730 and servo motor 732 are energized and the influent 303 (fluid with components) can be provided from a mixed or unmixed reservoir or equalization basin through the influent port 710 at a fixed volumetric rate through a combination of gravity feed and/or moving component 702 reciprocating action, as noted from the discussions surrounding FIGS. 1, 3, and 4B. The influent 703 passes through both a check valve 710A (which provides for one directional flow) and a normally open (NO) solenoid valve 710B into the filtration chamber 704. Pressure across the separation surface 708 is monitored as the filtrate 713 is discharged from the filtration chamber 704 through the filtration port 712 and through a second series of a normally open solenoid valve 712B and a directional check valve 712A where it is emptied into a reservoir. A normally closed (NC) solenoid valve 716B and directional check valve 716A prevent draw from the backwash fluid port 716 as well as a directional check valve 718A and a normally closed (NC) solenoid valve 718B prevent discharge through the backwash discharge port 718. In an example, a portion of the filtrate 713 can be, and often is, drawn back through the separation surface 708 to provide a partial backwash depending on the location of the NO solenoid valves 710B, 712B, yielding an additional oscillating transmembrane pressure that aids in mitigating the concentration polarization or gradient created by components 720 which cannot pass through the separation surface. The magnitude of oscillating transmembrane pressure can increase with component capture and filtrate discharge.

A backwash (fluid without components) cycle is initiated at a prescribed moment, and the PLC 730 energizes the NO 710B, 712B and NC 716B, 718B solenoids from the closed and open positions, respectively. This results in a reverse flow direction through the separation surface 708 and discharge through the backwash discharge port 718. Both the influent 703 and associated discharged filtrate 713 are stopped by the directional check valves 710A, 712A used in concert with energized NO solenoid valves 710B, 712B in the closed position. Simultaneously the directional check valves 716A, 718A are used in concert with the energized NC solenoid valves 716B, 718B (in the open position) allow the fluid without components (backwash) 717 to be drawn through the separation surface 708 in the reverse direction and the concentrated components 720 retained in the filtration chamber 704 are discharged. Using feedback from the sensors to the PLC 730, the backwash cycle can be a lesser time duration relative to the filtration cycle in order to concentrate the solids 720. As the cycle resets, influent 703 is provided to the filtration chamber 704 as the PLC 730 de-energizes the solenoid valves 710B, 712B (now open) and 716B, 718B (now closed) to initiate filtration.

In another example, the separation surface 708 is placed in such a way that the surface 724 is parallel to or offset from the moving component face 705 generating the oscillating transmembrane pressure. The flowing direction can be from the influent port 710 through the separation surface 708 to the filtrate port 712 or back through the separation surface 708 to the backwash discharge port 718. Also, the cavity 706 can contain a moving component 702 with apex seals 701 as the moving component 702 rotates past the various ports 710, 718 placed on the filtration chamber 704 and separation surface holder.

As noted in other examples, the backwash fluid 717 (i.e. fluid without components) can be drawn from a filtrate holding tank 711. In this example, the system 700 can link the backwash fluid port 716 and the filtrate holding tank 711 so the filtrate 713 can be drawn through the backwash fluid port 716 (and now the filtrate 713 becomes backwash fluid 717). Alternately, the backwash fluid port 716 and the filtrate check valve 712A can be removed, and the filtrate port 712 can act to both receive filtrate 713 on the filtration cycle, and release filtrate 713, as backwash fluid 717 on the backwash/flush cycles.

Experiment 1 (Solids Loading Test)

Turning now to specific experiments, one was conducted to demonstrate the capture of organic solids. Brewed coffee grounds were used as these, once dried, were sieved to establish particle size distributions. Additionally, this material is not as brittle or abrasive compared to other materials such as sand. One liter of the deionized water was combined with a total of 4.35 grams of brewed coffee ground subsequently dried; here 2.70 grams of solids sieved to yield particle sizes of 300<X<425 micron and 1.65-grams of 150<X<300 micron. An additional 0.6-L of deionized water was flowed through the influent reservoir to flush solids from the system. The system was operated using recurring cycles of 45-second filter and 45-second backwash (recycle) at 30-rpm using the 250-μm disc sieve. FIG. 8A depicts the results of the experiment. The total volume efficiency was calculated as the ratio of the effluent volume captured to the sum of both the effluent and backwash volumes. The total solids efficiency was the ratio of solids captured in advance of the effluent relative to the influent loading. Note that the solids capture in the backwash container is 79% with the bulk remaining in the system prior to the backwash container. These remaining solids can be captured in a container as future optimization of the filter/backwash cycle times and volumes are optimized.

Figure 8B:
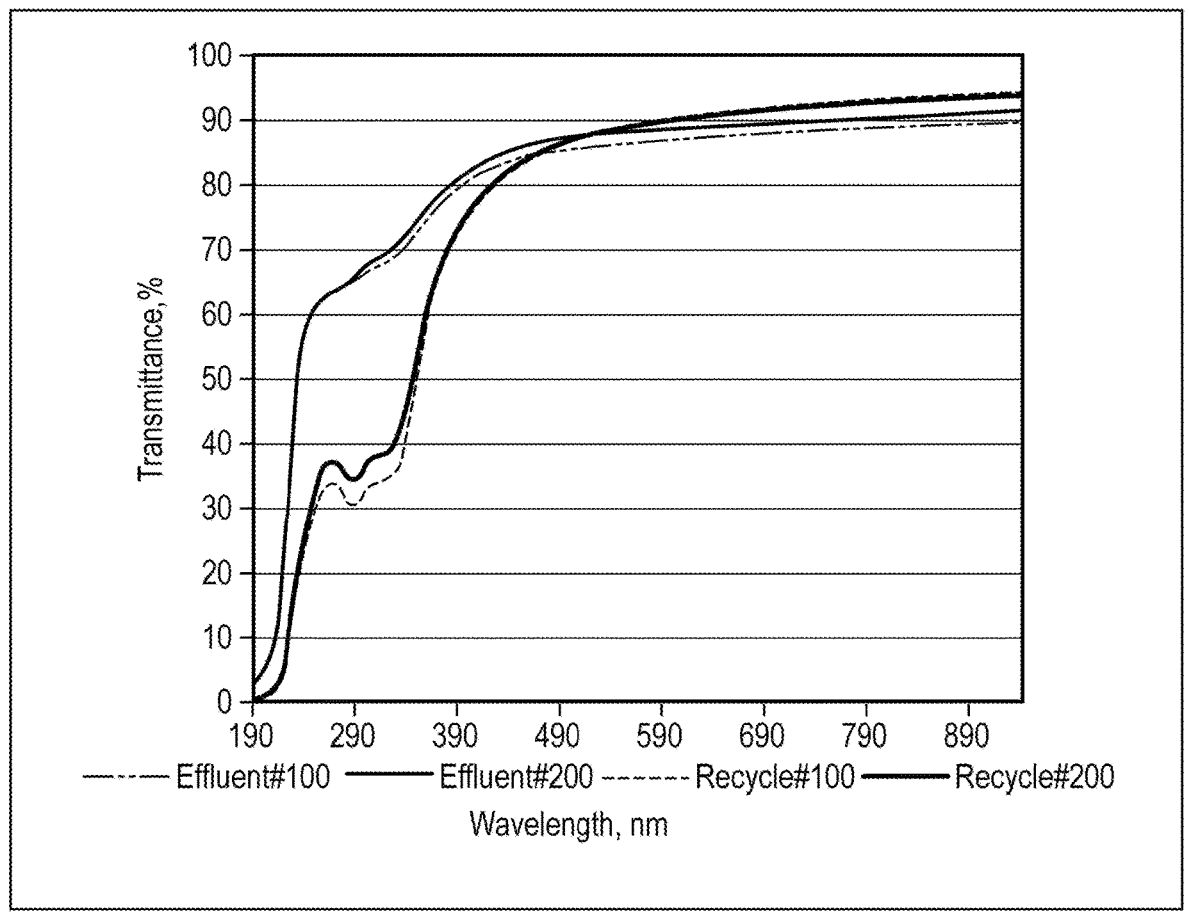
FIG. 8B is a graph depicting the transmittance of the effluent and backwash (recycle) samples of Experiment 1.

FIG. 8B depicts the transmittance of the effluent and backwash (recycle) samples. Note that the effluent samples contained greater transmittance. Also note that solids sizes smaller than those sieved were recorded presumably due to the additional hydrolysis of the brewed coffee grounds. Lower transmittance at smaller wavelengths was associated with other compounds such as caffeine.

Experiment 2 (Protein and Organic Solids Concentration Polarization Test)

To further examine concentration polarization affects due to proteins, a surrogate poultry processing chiller water was created using 75-g of chicken breast meat cut up into 1-in portions then placed into 100-mL deionized water; this stock solution was stored at for 1 week at 5° C. The entire stock was subsequently diluted to 2000-mL. The total diluted volume was filtered through a 600-micron sieve to remove gross solids. One liter of the sieved, diluted stock was then combined with 4.35 grams of brewed coffee ground subsequently dried and sieved to yield particle sizes of 300<X<425 micron. The remaining diluted stock (~1 L) was used to "flush" solids through the system. Recycle water was deionized water (starting volume was 1-L). The system was operated using recurring cycles of 45-second filter and 45-second backwash (recycle) at 30-rpm using the 250-μm disc sieve. FIG. 9A depicts the results of the experiment. Analysis of the diluted stock with and without coffee grounds was conducted for solids mass balance and protein analysis using the bicinchoninic acid assay (BCAEffluent and recycle samples were also analyzed.

Figure 9B:
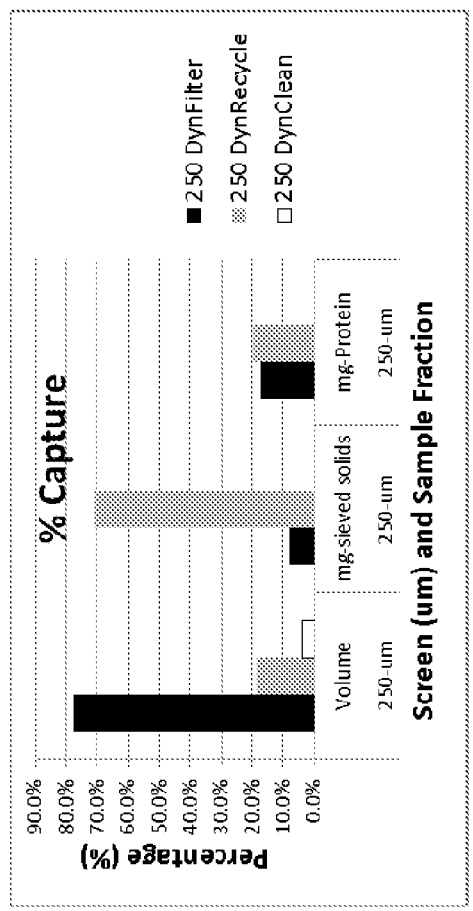
FIG. 9B is a graph depicting the capture efficiency (%) by the system of Experiment 2.

FIG. 9B depicts the capture efficiency (%) by the system. The volume percentages were calculated as associated volume divided by the total volume; note that approximately 100-mL of clean backwash water was assumed transferred to the effluent due to the increase in effluent volume relative to the influent added. Solids and protein capture for the effluent was calculated (1-effluent/total) and the ratio of the backwash to the total was plotted. Solids capture and protein as total milligrams was greater in the backwash (recycle) as compared to solids passed through the filter to the effluent container.

Experiment 3 (Marination/Industrial Facility Processing Liquid Stream)

Figure 10:
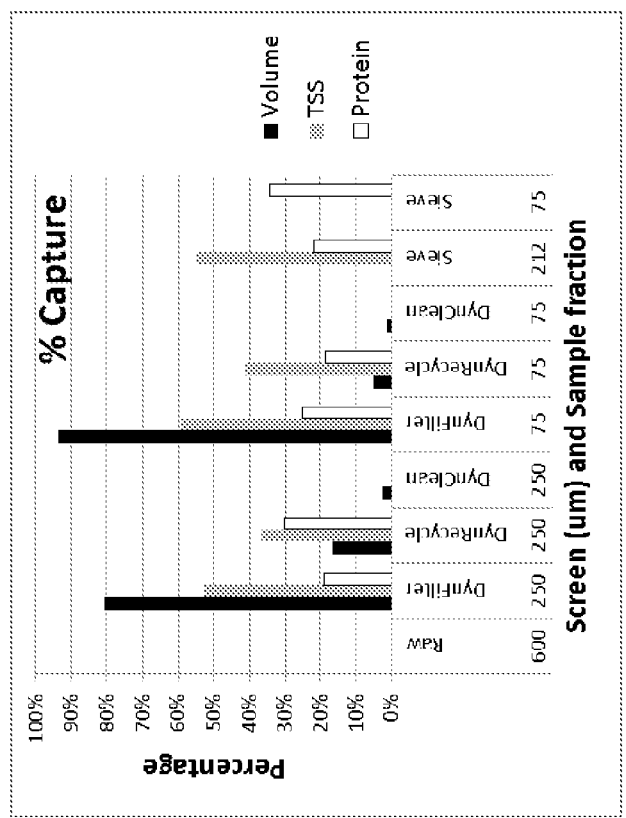
FIG. 10 is a graph depicting the total capture percentages for processing of a poultry marinating liquid stream of Experiment 3.

A marinating solution was obtained from a poultry processing facility to establish performance using an actual industrial liquid stream. For experiments the marinating solution was passed through 1.4-mm (1400 micron) sieve and then run through the system. Primary screens used in poultry processing applications are typically 1500- to 3000-μm. The system was operated using recurring cycles of 45-second filter and 45-second backwash (recycle) at 30-rpm using both the 250-μm and 75-μm disc sieves. Here the volume was passed through the 250-μm disc. That effluent was then passed through the system again using the 75-μm disc. FIG. 10 depicts the capture efficiency (%) by the system.

In both runs the effluent and backwash volumes were individually captured and analyzed (total suspended solids, BCA protein). The volume percentages were calculated as associated volume divided by the total volume; note that approximately 100-mL of clean backwash water was assumed transferred to the effluent due to the increase in effluent volume relative to the influent added. Solids and protein capture for the effluent was calculated (1-effluent/total) and the ratio of the backwash to the total was plotted. Solids capture and protein as total milligrams was greater in the backwash (recycle) as compared to solids passed through the filter to the effluent container. The 600-μm sieved influent was also passed through a 212-μm sieve and then again through a 75-μm sieve. Here, the TSS and protein capture was comparable to the system, although the 75-μm sieve captured a greater percentage of protein. As fats, oils and grease were not analyzed, this difference may be due to the coating of the sieve surface drained by gravity relative to the cyclic filtration approach.

Experiment 4 (Comparison with dead-end filtration using yeast)

Figure 11A:
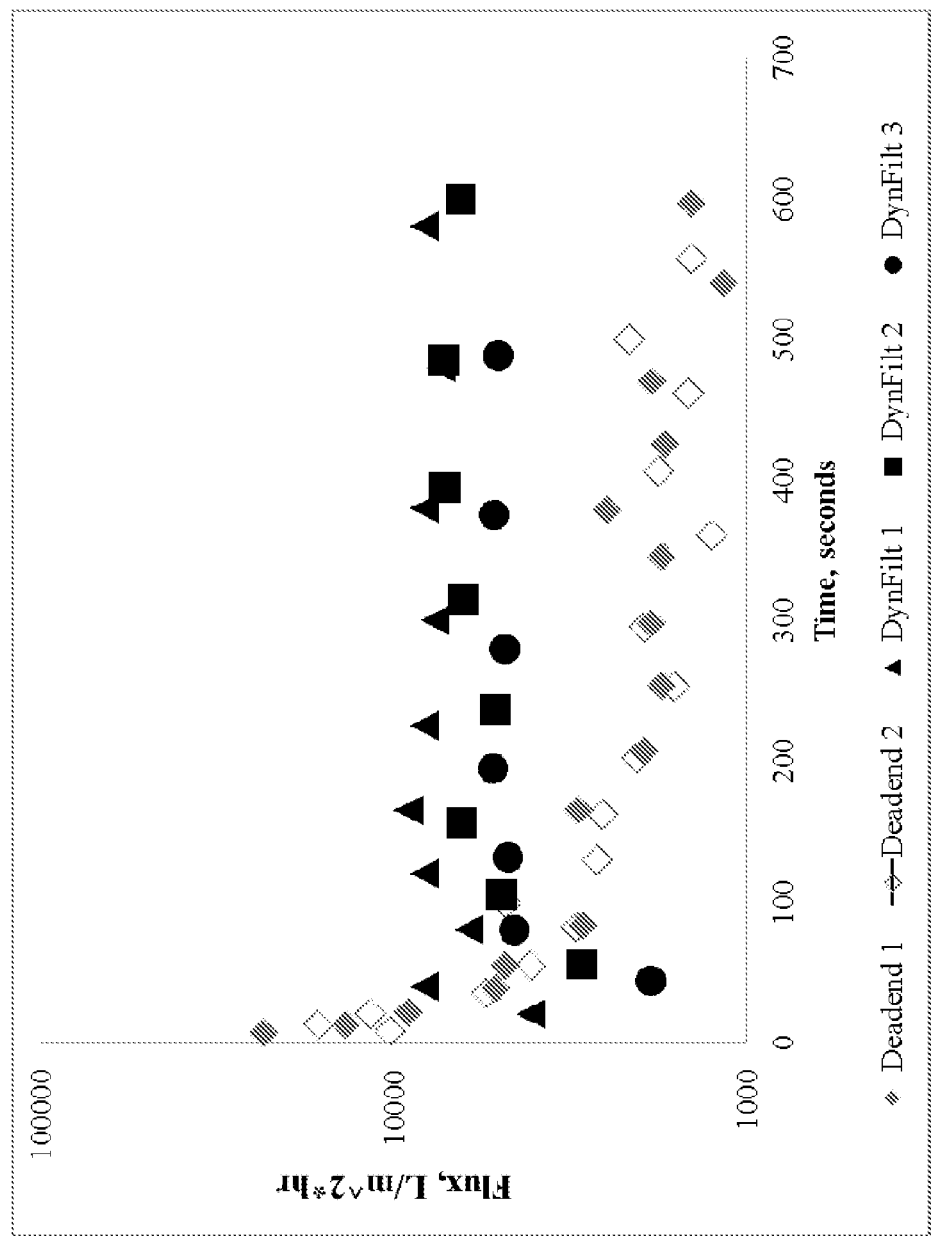
FIG. 11A is a graph illustrating a comparison of the flux between replicate samples for dead-end filtration versus triplicate runs for dynamic filtration in Experiment 4.
Figure 11B:
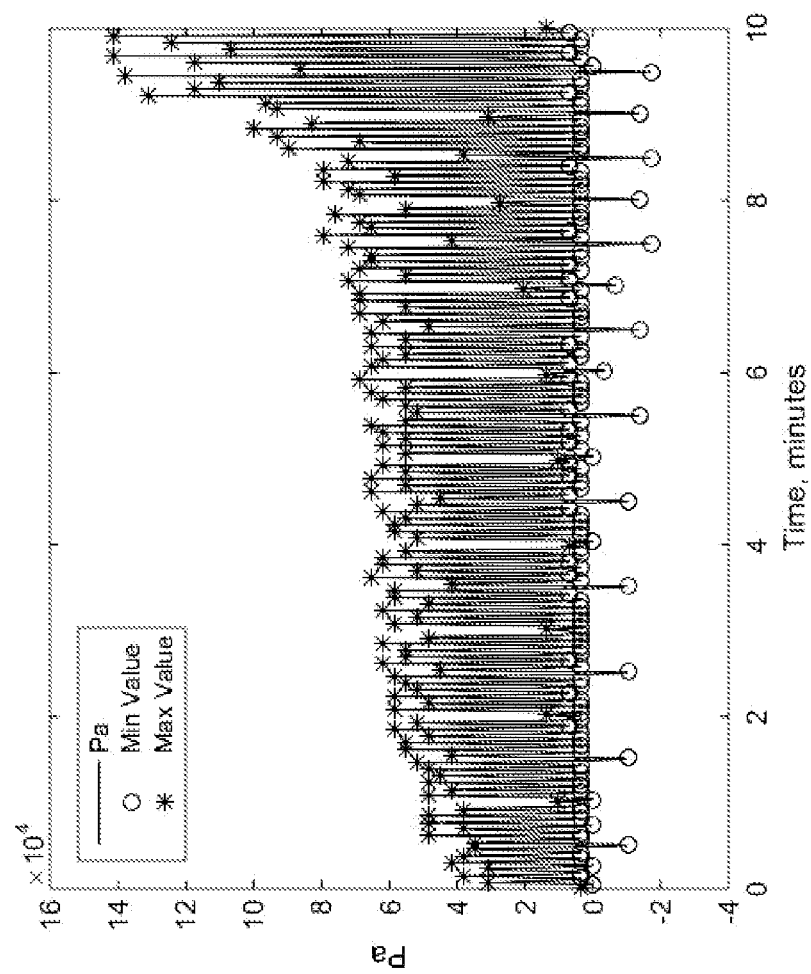
FIG. 11B is a graph illustrating a representative pressure profile for Experiment 4 with recycle (black circles)

Highly active yeast (Fleischmann's©) of 21.8-grams into 1-L water is mixed with a magnetic stir bar for 1-hr at room conditions. For each experiment a 200-mL aliquot was passed through a 0.45-μm membrane filter (Gelman Science©), with a membrane effective flow surface area of 9.08-m². For dead-end filtration the sample was drawn through a Buchner funnel at 20-psig. For dynamic filtration the sample was processed at 60-rpm. FIG. 11A depicts the flux rate through the membrane filters and FIG. 11B illustrates the oscillating transmembrane pressure with recycle (black circles). Note that the dead-end filter quickly falls off while the dynamic filtration system reaches steady-state at a flux rate over 400% higher (6859±1193 L/m²*hr versus 1288±212 L/m²*hr).

Turning now to the science behind the cyclic filtration system, Formula 1 is the general filtration equation:

$$\frac{dt}{dV} = \frac{\alpha \mu c}{\Delta P A^2} V + \frac{\mu R_m}{A \Delta P} \qquad \text{Formula 1}$$

where dt/dv is the change in volume over time; V is the volume of the filtrate (m³); α is the specific resistance (m/kg); μ is the viscosity of the filtrate (Pa·s); c is the average dry cake mass/volume (kg/m³); ΔP is the pressure drop across the filter (Pa); A is the area of the filter (m²); and $R_m$ is the resistance (m⁻¹). Now solving for the pressure drop:

$$\Delta P = \frac{\alpha \mu c}{A^2} \frac{dV}{dt} V + \frac{\mu R_m}{A} \frac{dV}{dt} \qquad \text{Formula 2}$$

Using these relationships, one can solve for constant pressure in experimental settings with a batch flow:

$$\frac{V^2}{2} = \frac{A^2}{\alpha \mu c} V + \frac{A}{\mu R_m} \qquad \text{Formula 3}$$

The equation can also be solved for continuous flow, which accounts for a pressure drop, as in encountered in read-world settings:

$$\Delta P = \frac{\alpha \mu c}{A^2} qV + \frac{\mu R_m}{A} q \qquad \text{Formula 4}$$

where q is the flow rate (m³/s). The formula can also be solved for backwash flow.

$$\frac{dV}{dt} = \frac{A^2 \Delta P_{wash}}{R_c (\mu V_f + AL)} \qquad \text{Formula 5}$$

where $\Delta P_{wash}$ is the pressure drop across the filter during the backwash cycle (Pa); $R_c$ is the cake resistance (m⁻¹), $V_f$ is the volume of the filtrate (m³), and L filter depth (m).

Figure 12:
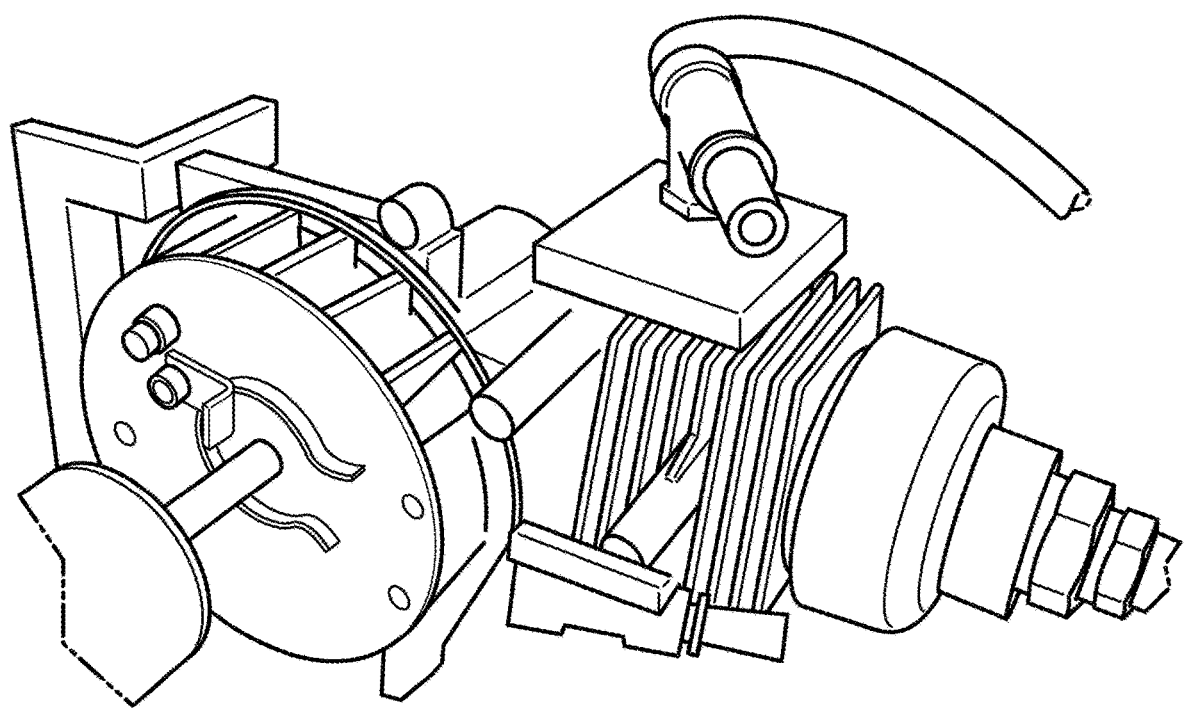
FIG. 12 illustrates a prototype of the present invention.

FIGS. 12, 13, 14, 15A and 15B all illustrate another example of an aspect of the present invention. FIG. 12 illustrates a prototype 800 having a filter chamber 804 with a filter at one end and a motor 832 driving a piston (not shown). The piston reciprocates from left to right in the figure as illustrated. Influent is brought in to the filter chamber 804 through influent port 810 and the filtrate exits through the filtrate port 812. Further, once the system is backwashed, the solids drop into a discharge collection 818.

Figure 13:
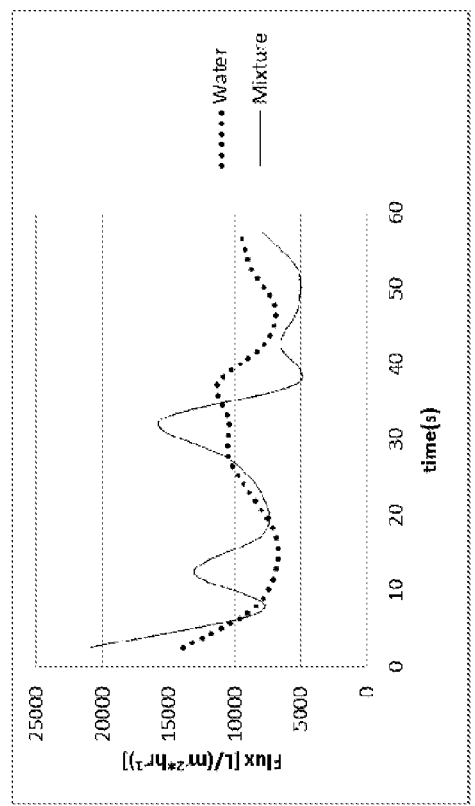
FIG. 13 illustrates comparison of the flux rates through the prototype.
Figure 15B:
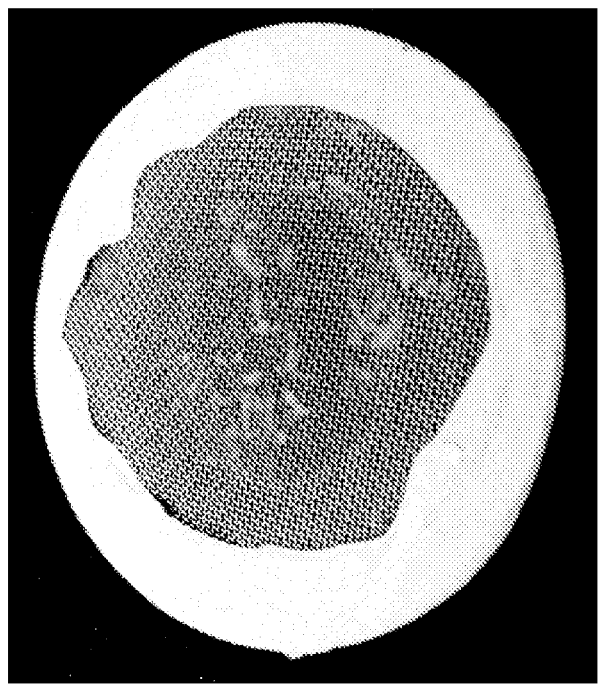
FIGS. 15A and 15B illustrate the solids build-up on the filter in the prototype.
Figure 15A:
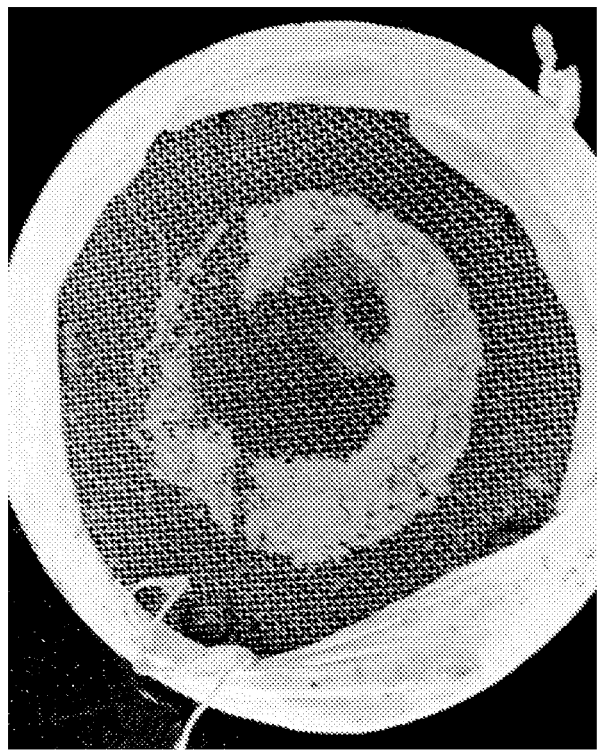

In this example, first water was passed through the prototype 800 to determine the flux caused by the filter 808 itself. Next, water containing coffee grounds, which were sieved to determine the various particle sizes, and the mixture was passed through the filter 808 to also determine the flux of the system when filtering out solids. The comparison of the flux rates is illustrated in FIG. 13. FIG. 14 is a table outlining the sample volume and the concentration of retained solids. FIGS. 15A and 15B illustrate the solids build-up on the filter.

Figure 16:
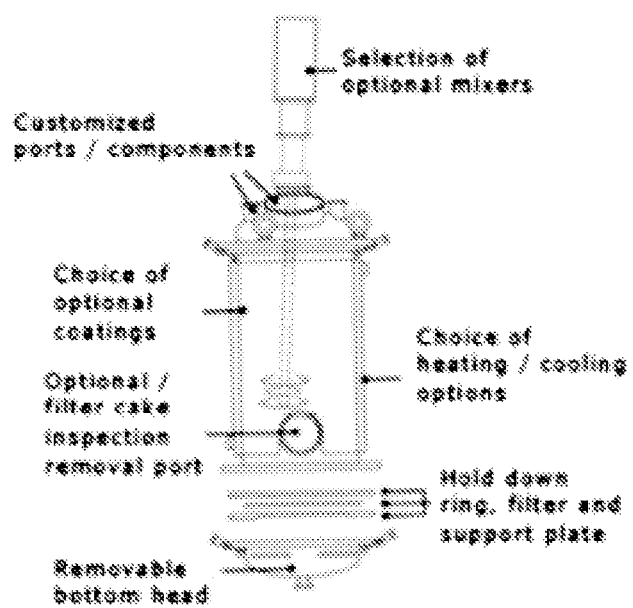
FIG. 16 illustrates a prior art Nutsche filter.

FIG. 16 illustrates another example of the types of filters the invention can be utilized with. FIG. 16 is an example of a prior art Nutsche filter. This type of filter is typically used in applications such as dye, paint, pharmaceutical production and waste water treatment. A Nutsche filter puts the filtration process under vacuum or pressure and can be carried out in closed vessels. Another feature is that and solids can be discharged directly into a drier (not illustrated). A typical unit consists of a dished vessel with a perforated plate. The entire vessel can be kept at the desired temperature by using a limpet jacket, jacketed bottom dish and stirrer (blade and shaft) through which heat transfer media can flow. The vessel can be made completely leak-proof for vacuum or pressure service. A multipurpose agitator is a feature of a Nutsche filter. The agitator performs a number of operations through movement in axes both parallel and perpendicular to the shaft as well as in rotation.

FIGS. 17A and 17B illustrate an example of a Nutsche filter 900 modified to use the present inventive concept. The moving component 902 in this example can be capable of both linear and rotational movement. While moving linearly, it acts as the other moving components and pistons described above. When the moving component 902 rotates, it acts as an agitator, mixer or stirrer, the function of which is described below. A filtration chamber 904 can be dome shaped and the influent 903 can enter through an inlet port/valve 910 near the top of the dome. The chamber 904 is sealed and can be pressurized or placed under a vacuum. The filter chamber 906 can be heated, cooled, or temperature controlled by the use a temperature jacket.

For the filtration process, in a typical pressurized Nutsche filter, another fluid (typically a gas) is pumped into the filter after the influent 903, to force the influent through a separation surface 908. This separates the solids 920 from the filtrate 913 and the filtrate 913 can be discharged through outlet valve/port 912. In the present example, the moving component 902 creates the pressure by moving "downwards", as illustrated, to force the influent 903 through the filter 908 and out the port 912.

For the cleaning or flush process, backwash fluid 917 can be discharged into the chamber 904 through backwash fluid port/valve 916. Alternately, or in addition to, the backwash fluid 917 can be inputted from the inlet valve/port 910 or outlet valve 912. At this point, the moving component 902 can draw back, creating a negative pressure to pull the solids 920 from the filter 908. Also, the moving component can stroke all the way to the solids 920 and then rotate, to break up the solids for a more efficient discharge of the solids through the solids port/valve 918. This is illustrated in FIG. 17B, which is a magnified section of FIG. 17A during the flush cycle. In further examples, the moving component 902 may be textured or have protrusions to better penetrate and break up the solids 920. Note that the moving component 902 can also rotate during the filtration cycle, allowing for the mixing of the influent 903 as it is being filtered.

FIGS. 18A and 18B illustrate an example of a candle filter 1000 of the present invention. The piston 1002 has a relatively short stroke to the top of the candles 1008, which are multiple filters set vertically within the filter chamber 1004. FIG. 18A illustrates the filtrations cycle. The influent 1003 is discharged into the bottom of the filter chamber 1004 through the influent port 1010. The influent 1003 then rises vertically through the candle filters 1008 on the draw stroke of the piston 1002. The filtrate 1013 comes off the top of the candle filters and is released out of the filtrate port/valve 1012.

For the flushing of the filters, FIG. 18B illustrates that the backwash fluid 1017 can be discharged from a backwash fluid port/valve 1016. Note that the fluid can be air, and can also be filtrate released from filtrate port 1012, either in combination with, or as the backwash fluid alone. Backwash discharge port 1018 can be opened and the solids (not illustrated) can be discharged by gravity, along with a pressure stroke from the piston. Note that candle filters, like Nutsche filters can be jacketed to control temperature.

Figure 19:
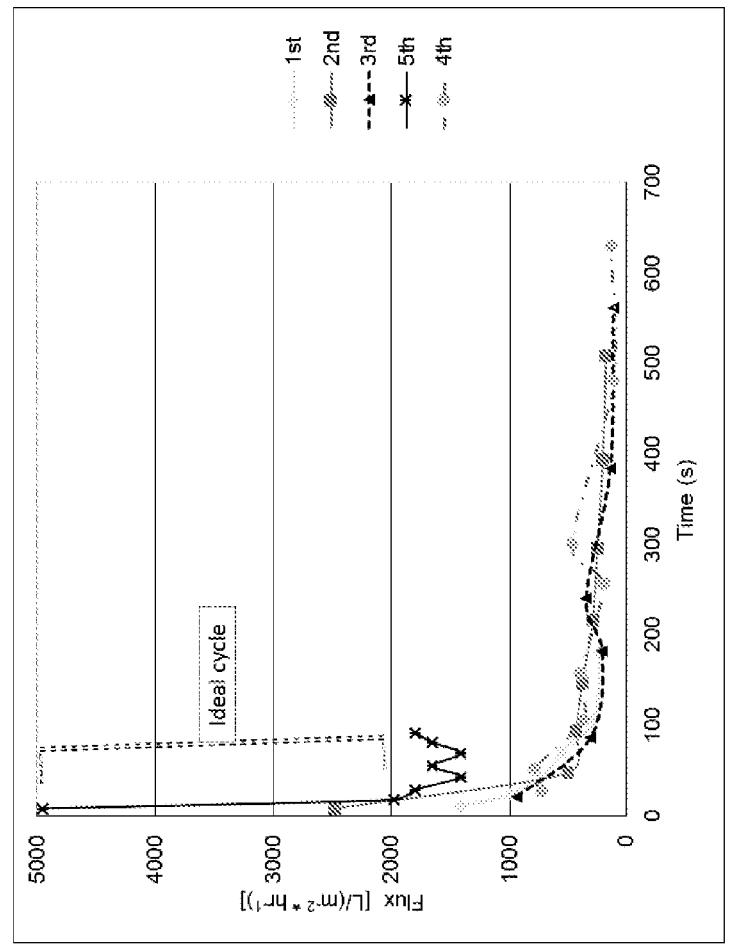
FIG. 19 is a graph of flux over time using various shear rates.

FIG. 19 illustrates a flux rate over time using shear. As illustrated, the even with shear the flux rate decreases. The present invention, as demonstrated in FIG. 11A, can reach the optimum or ideal flux rate as a balance of solids loading and pressure generated from the piston.

FIG. 19 depicts experimental data for shear (caused by a propeller) deployed above a deadend filter. The ideal cycle indicates a region where the current invention utilizing oscillating transmembrane pressures can operate, especially in a candle type filter, as illustrated in FIGS. 18A & 18B. This identifies the optimum flux rate at which to cycle the transmembrane pressures.

Figure 20:
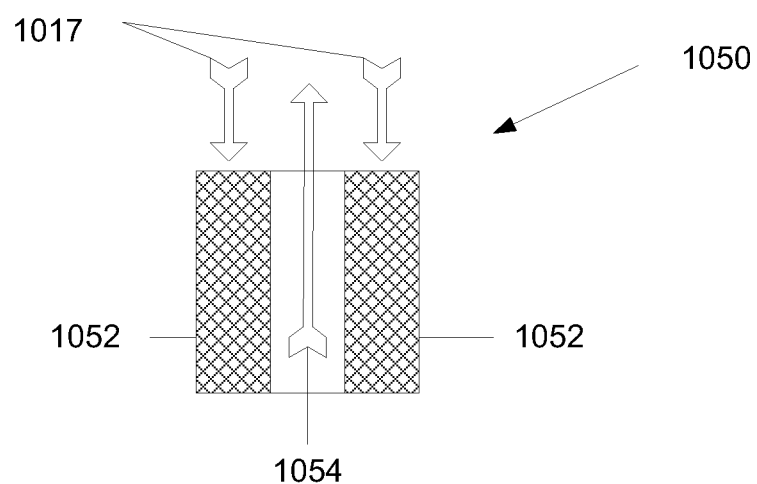
FIG. 20 illustrates an example of a backwash fluid filter which can be used with the present invention.

FIG. 20 illustrates a backwash fluid filter 1050. With this example, any of the backwash discharge ports/drains 114, 218, 318, 718, 818, 918, 1018 and any discussed below, can be substituted with a backwash fluid filter 1050. The backwash fluid 1017, which includes a fluid and suspended particles/solids can pass through solids filter 1052 and the filtered backwash fluid 1054 can be returned to the filter chamber 1004 on the next influent/filtering stroke to be filtered, or it can be discharged separately. The use of the backwash fluid filter 1050 can aid in balancing pressure during filtering and backwash to better manage solids removal. The backwash fluid filter 1050 enables adding resistance during backwash. This also assists in managing the backwash when the valves are problematic. Note that in some example, once the filter 1050 is at capacity, it can be removed, along with its entrapped solids, and replaced. The filter 1050 can then be cleaned and reused or disposed of.

Figure 21:
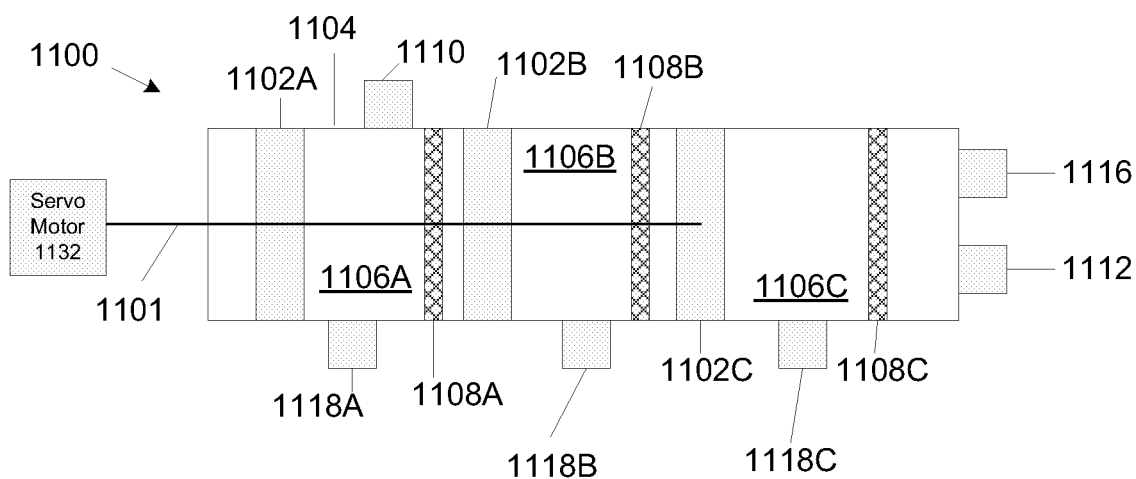
FIG. 21 illustrates an example of a multiple linear piston system.

The below examples expands on the above concepts using multiple systems in concert. FIG. 21 illustrates a multiple linear pistons 1100 system. Here, multiple moving components 1102A, 1102B, 1102C are actuated using one or more piston rods 1101. All of the moving components 1102A, 1102B, 1102C are actuated at the same time and have the same stroke, thus all are either in a pressure or draw stroke. The can share a common filtration chamber 1104 and each have their own cavity 1106A, 1106B, 1106C therein or each can be separated. In the illustrated example, an influent enters through inlet port/valve 1110 and is filtered through filter 1108A. This filtrate passes to the second chamber 1106B and is filtered through second filter 1108B, this second filtrate is further passed to the third chamber 1106C and filtered through third filter 1108C. The final filtrate is then released through outlet port/valve 1112. In the examples, the filters 1108A, 1108B, 1108C can be of the same or different porosity, one example can have each successive filter have a finer and finer pore size.

Backwashing is performed as described above, wherein backwash fluid can be let in via the backwash fluid valve/ port 1116 and each cavity 1106A, 1106B, 1106C can have its own backwash discharge valve/port 1118A, 1118B, 1118C to remove the solids. Note that the illustrated example has a singular inlet, outlet, and back wash fluid port 1110, 1112, 1116, but there can be additional ports to match each cavity 1106A, 1106B, 1106C, depending on the design. The fluids can leapfrog from cavity to cavity directly or through the series of additional ports. The benefit is that a single motor 1132 can run multiple moving components 1102A, 1102B, 1102C.

Figure 22:
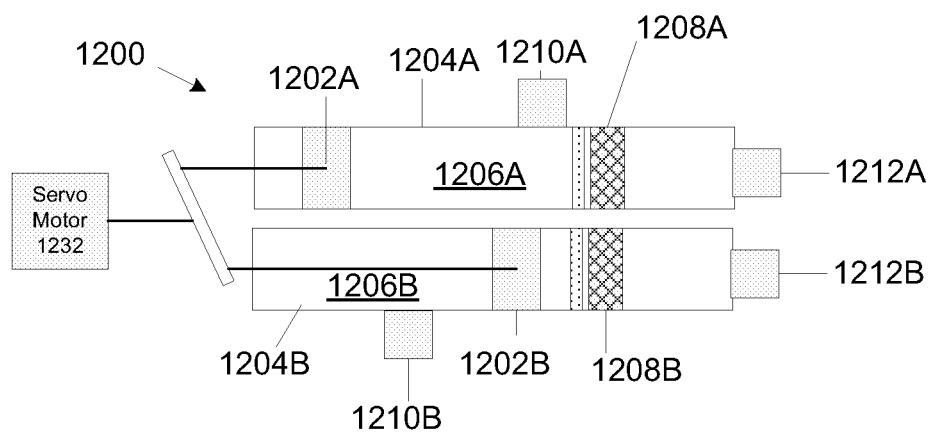
FIG. 22 illustrates another example of a dynamic filtration system using an axial piston system.

FIG. 22 illustrates another example of a dynamic filtration system using an axial arrangement 1200. Here multiple moving components 1202A, 1202B are still driven by a common motor 1232, however, now the piston strokes are offset. As the first moving component 1202A can be in a draw stroke, the second moving component 1202B can be in a pressure stroke. There can be multiple filters 1208A, 1208B for each cavity 1206A, 1206B, and ports 1210A, 1210B, 1212A, 1212B to accommodate the influent and filtrate for each cavity 1206A, 1206B. There can also be similar backwash ports (not illustrated) as needed to clear each cavity 1206A, 1206B.

Figure 23:
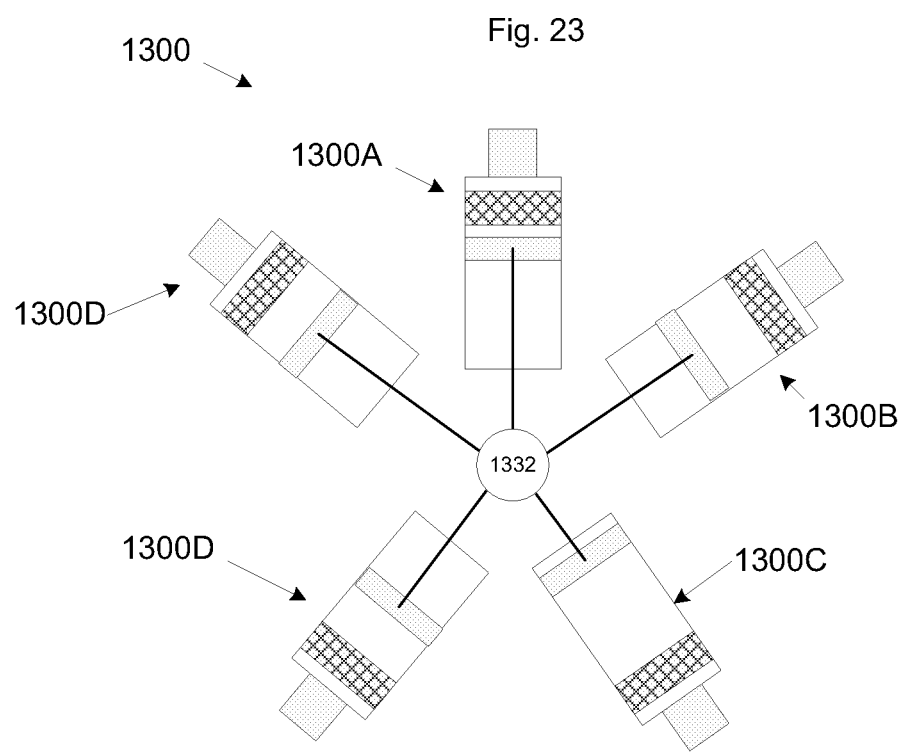
FIG. 23 illustrates a further multiple piston concept using a radial piston system.

FIG. 23 illustrates the multiple piston concept with a radial system 1300. Here again multiple systems 1300A to 1300E function similar to the examples above and include pistons, piston rods, filters, and multiple valves/ports to permit the influent, filtrate and backwash to circulate through the system. The multiple systems 1300A to 1300E can be driven from a single motor 1332. Given the radial nature of the system 1300 each individual system 1300A to 1300E can be in a different stage of the pressure and draw strokes, and also in different cycles, from filter to flush.

Two of the multiple piston systems 1100, 1200, are described as alternately filtering the same influent through finer and finer filters, or separately filtering two different influent streams. For all three examples 1100, 1200, 1300, either is contemplated, as well as mixed designs. Linear system 1100 can filter multiple influents, one in each cavity while the axial system can pass the influent from one piston barrel to the other. In the radial design, the influent can travel around the systems 1300A to 1300E being filtered finer and finer or five separate streams can be processed. All three systems can also perform a mixture. For example, in the radial system 1300, systems 1300A and 1300B can filter the same influent one, to the other, same with systems 1300C and 1300D, while system 1300E is allowed to backwash. The cycles can then rotate through the system 1300, with 1300E and 1300A; 1300B and 1300C; and 1300D allowed to backwash, and so on.

Also note that while each of the systems 1100, 1200, 1300 are illustrated with a particular number of pistons/systems, one of ordinary skill can expand the number of systems that can be either linked to finer and finer filter influent, or be driven from the same motor, or both.

Figure 24:
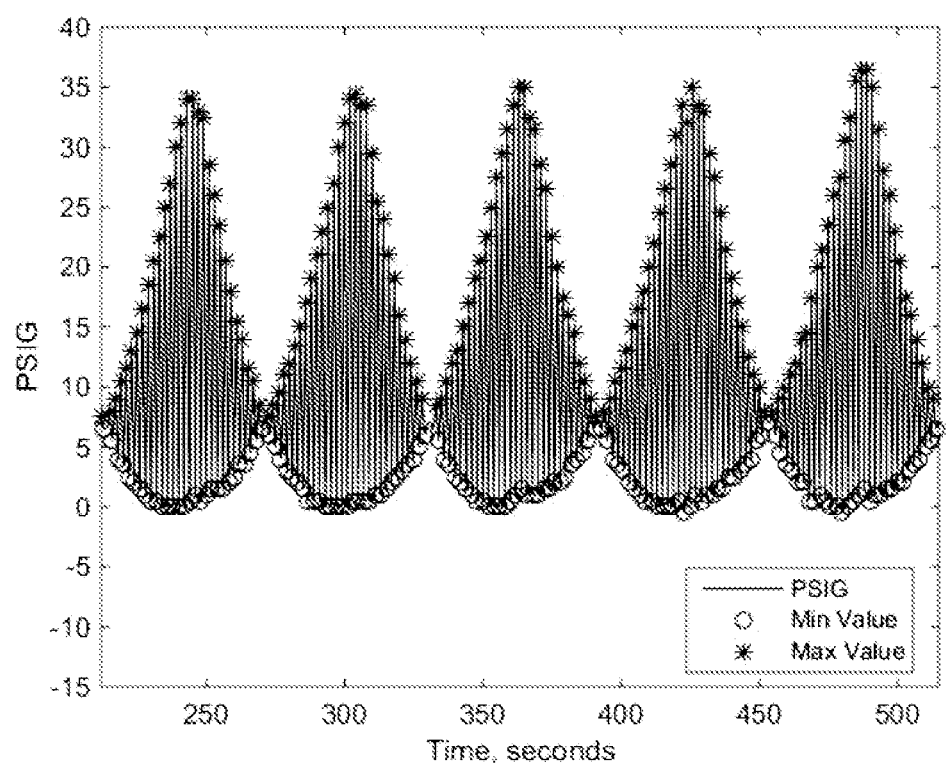
FIG. 24 illustrates pressure (in PSIG) across a filter.

FIG. 24 illustrates pressure (in PSIG) across a filter operated primarily with reverse flow. Pressure was monitored using an Omega differential wet/wet unidirectional pressure transducer with a range of 250-psig wired directly to the PLC. Pressure data reported was collected using a battery-powered remote current loop data logger capturing data every second. Black dots represent individual data points.

Figure 25:
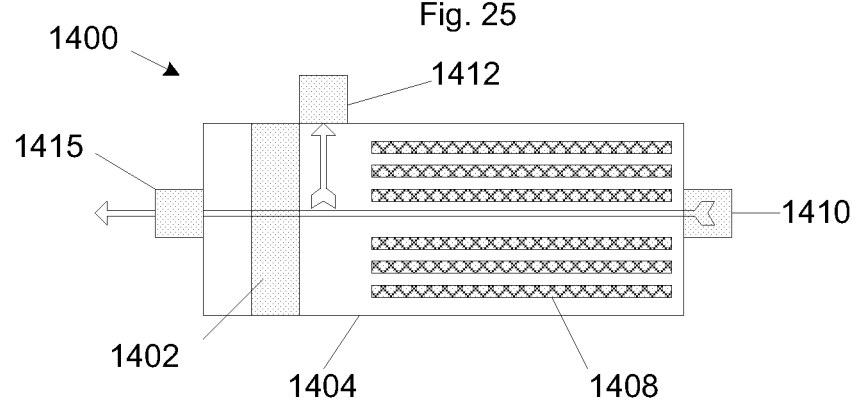
FIG. 25 illustrates using the inventive concept for the motive force for hollow fiber membranes in a bioreactor.

FIG. 25 illustrates using the inventive concept for the motive force (vacuum draw) used for hollow fiber membranes in bioreactors 1400. Typical bioreactors use air sparging to keep the fiber membranes' 1408 surfaces clean. An influent is drawn (or permitted to flow) through the influent port/valve 1410 on the draw stroke of the piston 1402, this also draws the influent through the fiber membranes 1408, allowing it to be filtered, and then pass out as filtrate through filtrate port/valve 1412. The retentate passes through the filtration chamber 1404 and out the other side through a retentate port/valve 1415. The oscillating pressure of the present invention can increase the flux rates as compared with the prior art. Backwashing can occur on the pressure stroke and any solids can be flushed through the retentate port/valve 1415 once discharged from the filters 1408.

Given the above examples, another way to describe the above concepts is that the fluid "upstream" which is before or in front of the separation surface is an influent. In most of the figures (e.g., FIGS. 2-4, 7, 21, 22, and 25) the influent is to the "left" of the filter as illustrated. Fluid that is "downstream" can be after or behind the separation surface and can be effluent or filtrate. This is illustrated as being to the "right" of the filter. Thus, backdraw or reverse fluid is downstream and then brought upstream by the pressure gradient formed by the oscillating transmembrane pressure generator. Note that the pressure generator can be a form of hydraulic machinery or variations in static head between the particular fluid reservoirs and the filter. Thus, reverse flow is drawn through the separation surface and becomes backwash when it and solid components are discharged through the backwash fluid discharge port. In certain examples, the backdraw or reverse fluid can be filtrate or fluids typically cleaner than the influent (i.e. less components).

As is apparent, there are numerous modifications of the preferred example described above which will be readily apparent to one skilled in the art, such as many variations and modifications of the embolic device including numerous coil winding configurations, or alternatively other types of embolic devices. Also, there are many possible variations in the materials and configurations of the release mechanism. These modifications would be apparent to those having ordinary skill in the art to which this invention relates and are intended to be within the scope of the claims which follow.

What is claimed is:

1. A method of filtering a fluid with components via positive and negative pressure oscillation comprising:
    performing one or more filtration cycles on fluid with components, each filtration cycle comprising:
        creating an oscillating positive and negative transmembrane pressure gradient in an influent side of a filtering chamber containing the fluid with components relative to a separation surface using an oscillating transmembrane pressure generator;
        wherein the oscillating positive and negative transmembrane pressure gradient in the influent side of the filtering chamber results from the oscillations between a forward flow of the fluid and a reverse flow of the fluid;
        displacing a portion of the forward flow of the fluid from the influent side of the filtering chamber, through the separation surface and into a filtrate side of the filtering chamber using the pressure gradient of the forward flow of the fluid formed by the oscillating transmembrane pressure generator, filtering at least a portion of the components of the fluid from the influent side with the separation surface, and forming a filtrate with a concentration of components in the filtrate side of the filtering chamber;
        wherein the concentration of components of the fluid in the influent side is higher than the concentration of components in the filtrate; and
        displacing a portion of the reverse flow of the fluid in the influent side of the filtering chamber using the pressure gradient formed by the oscillating transmembrane pressure generator; and
    performing a backwash cycle consisting of:
        opening a backwash fluid valve on the filtrate side of the filtering chamber;
        providing the backwash fluid on the filtrate side of the filtering chamber;
        dislodging at least a portion of the components previously retained on the separation surface during the one or more filtration cycles using a backwash fluid flowing from the filtrate side of the filtering chamber, though the separation surface, and into the influent side of the filtering chamber;
    wherein the concentration of components in the backwash fluid in the influent side of the filtering chamber is higher than the concentration of components in the backwash fluid in the filtrate side;
        opening a backwash discharge valve on the influent side of the filtering chamber; and
        draining at least a portion of the backwash fluid away from the influent side of the filtering chamber through the backwash discharge valve and away from the influent side of the filtering chamber;
    wherein the direction of flow of both the backwash fluid and the reverse flow of the fluid during the one or more filtration cycles are the same.

2. The method of claim 1, wherein the backwash fluid is a different fluid than the fluid used in the one or more filtration cycles.

3. The method of claim 1, wherein the flow of the backwash fluid during dislodging is uni-directional, flowing consistently from the filtrate side of the filtering chamber, though the separation surface, and into the influent side of the filtering chamber.

4. The method of claim 1, wherein the backwash cycle occurs after each filtration cycle.

5. The method of claim 1, wherein the backwash cycle occurs after two or more successive filtration cycles without a backwash cycle therebetween.

6. A method of filtering a fluid with components via positive and negative pressure oscillation comprising:
    performing one or more filtration cycles on fluid with components, each filtration cycle comprising:
        creating an oscillating positive and negative transmembrane pressure gradient in an influent side of a filtering chamber containing the fluid with components relative to a separation surface using an oscillating transmembrane pressure generator;
        wherein the oscillating positive and negative transmembrane pressure gradient in the influent side of the filtering chamber results from the oscillations between a forward flow of the fluid and a reverse flow of the fluid;
        wherein the separation surface is disposed perpendicular to the directions of the forward flow of the fluid and the reverse flow of the fluid;

displacing a portion of the forward flow of the fluid from the influent side of the filtering chamber, through the separation surface and into a filtrate side of the filtering chamber using the pressure gradient of the forward flow of the fluid formed by the oscillating transmembrane pressure generator, filtering at least a portion of the components of the fluid from the influent side with the separation surface, and forming a filtrate with a concentration of components in the filtrate side of the filtering chamber;

wherein the concentration of components of the fluid in the influent side is higher than the concentration of components in the filtrate; and displacing a portion of the reverse flow of the fluid in the influent side of the filtering chamber using the pressure gradient formed by the oscillating transmembrane pressure generator; and performing a backwash cycle comprising:

dislodging at least a portion of the components previously retained on the separation surface during the one or more filtration cycles using a uni-directional flow of backwash fluid, flowing from the filtrate side of the filtering chamber, though the separation surface, and into the influent side of the filtering chamber;

wherein the concentration of components in the backwash fluid in the influent side of the filtering chamber is higher than the concentration of components in the backwash fluid in the filtrate side; and draining at least a portion of the backwash fluid away from the influent side of the filtering chamber;

wherein the direction of flow of both the backwash fluid and the reverse flow of the fluid during the one or more filtration cycles are the same.

7. The method of claim 6, wherein the backwash fluid is a different fluid than the fluid used in the one or more filtration cycles.

8. The method of claim 6, wherein the backwash cycle occurs after each filtration cycle.

9. The method of claim 6, wherein the backwash cycle occurs after two or more successive filtration cycles without a backwash cycle therebetween.

10. The method of claim 6, wherein during at least one filtration cycle, the filtration cycle further comprises:

opening a filtrate valve on the filtrate side of the filtering chamber providing a path for at least a portion of the filtrate to exit the filtrate side of filtering chamber; and closing an influent valve on the influent side of the filtering chamber and at least one backwash fluid valve on the filtrate side of the filtering chamber.

11. The method of claim 6 further comprising disposing the separation surface at an orientation perpendicular to the directions of the forward flow of the fluid and the reverse flow of the fluid of a filtration cycle.

12. The method of claim 6, wherein a first filtration cycle of the filtration cycles further comprises as a first step, discharging the fluid into the influent side of the filtering chamber.

13. The method of claim 6, wherein each filtration cycle further comprises as a first step, discharging the fluid into the influent side of the filtering chamber.

14. The method of claim 6, wherein each reverse flow of fluid in the influent side of the filtering chamber formed by the oscillating transmembrane pressure generator during one or more filtration cycles comprises at least a portion of the components previously retained on the separation surface.

15. The method of claim 1, wherein during at least one filtration cycle, the filtration cycle further comprises:

opening a filtrate valve on the filtrate side of the filtering chamber providing a path for at least a portion of the filtrate to exit the filtrate side of filtering chamber; and closing an influent valve on the influent side of the filtering chamber and at least one backwash fluid valve on the filtrate side of the filtering chamber.

16. The method of claim 6, wherein during the backwash cycle, the backwash cycle further comprises opening a backwash fluid valve on the filtrate side of the filtering chamber;

providing the backwash fluid on the filtrate side of the filtering chamber; and opening a backwash discharge valve on the influent side of the filtering chamber during draining at least a portion of the backwash fluid away from the influent side of the filtering chamber;

wherein the concentration of components in the backwash fluid in the filtrate side of the filtering chamber is negligible.

17. The method of claim 1 further comprising disposing the separation surface at an orientation perpendicular to the directions of the forward flow of the fluid and the reverse flow of the fluid of a filtration cycle.

18. The method of claim 1, wherein a first filtration cycle of the filtration cycles further comprises as a first step, discharging the fluid into the influent side of the filtering chamber.

19. The method of claim 1, wherein each filtration cycle further comprises as a first step, discharging the fluid into the influent side of the filtering chamber.

* * * * *